(12) United States Patent
Torii et al.

(10) Patent No.: US 7,797,703 B2
(45) Date of Patent: Sep. 14, 2010

(54) REAL-TIME SCHEDULABILITY DETERMINATION METHOD AND REAL-TIME SYSTEM

(75) Inventors: Osamu Torii, Tokyo (JP); Seiji Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1576 days.

(21) Appl. No.: 11/085,532

(22) Filed: Mar. 22, 2005

(65) Prior Publication Data
US 2005/0229177 A1 Oct. 13, 2005

(30) Foreign Application Priority Data
Mar. 26, 2004 (JP) ............... 2004-093020

(51) Int. Cl.
*G06F 9/46* (2006.01)
*G06G 7/00* (2006.01)
*G06G 7/32* (2006.01)

(52) U.S. Cl. ............... 718/102; 708/801; 708/802

(58) Field of Classification Search ......... 718/102–103; 708/1, 100, 800
See application file for complete search history.

(56) References Cited

U.S. PATENT DOCUMENTS 6,466,962 B2 * 10/2002 Bollella ............... 718/107
7,086,057 B2 * 8/2006 Hayashi ............... 718/102

OTHER PUBLICATIONS

Baker, Theodore, *Multiprocessor EDF and Deadline Monotonic Schedulability Analysis*, Proceedings of the 24th IEEE International Real-Time Systems Symposium (RTSS'03), 2003, 10 pages.

Office Action in Chinese Application No. 200510059298.4, dated Dec. 15, 2006 and English-language translation thereof.

(Continued)

*Primary Examiner*—Meng-Ai An
*Assistant Examiner*—Adam Lee
(74) *Attorney, Agent, or Firm*—Nixon & Vanderhye, PC

(57) ABSTRACT

Schedulability determination method of determining whether real-time scheduling of tasks is possible using processors, includes calculating $L_k$ and $\Sigma_{i=1...N} M_i * U_{k,i}$, ($1 \leq k, i \leq N$; k, i: integer) where $L_k$ corresponds to task-k, $M_i$ represents number of the one or more processors simultaneously used by task-i, $U_{k,i}$ corresponds to task-k and task-i, and N represents number of tasks, and determining that real-time scheduling of tasks is possible using processors, if tasks all satisfy conditions, $\Sigma_{i=1...N} M_i * U_{k,i} \leq L_k$ for all k ($1 \leq k \leq N$), wherein $L_k$ corresponds to task-k which is to be detected to satisfy corresponding one of conditions, $L_k$ being expressed as follows if $M_k \leq (M+1)/2$, $L_k = (M - M_k + 1) - (M - 2M_k + 1)C_k/D_k$, and $U_{k,i}$ is expressed as follows if $M_k \leq (M+1)/2$, $M_i < (M+1)/2$, and $X_{k,i} \leq 0$, (1)

$U_{k,i} = C_i/T_i \{1 + (T_i - D_i)/D_k\} + C_i/D_k$, if $M_k \leq (M+1)/2$, $M_i < (M+1)/2$, and $0 < X_{k,i} < C_i/T_i$, (2)

$U_{k,i} = C_i/T_i \{1 + (T_i - D_i)/D_k\} + (C_i - X_{k,i} * T_i)/D_k$, and if $M_k \leq (M+1)/2$, $M_i < (M+1)/2$ and $C_i/T_i \leq X_{k,i}$, (3)

$U_{k,i} = C_i/T_i \{1 + (T_i - D_i)/D_k\}$, where M represents number of processors, $T_i$ represents interval of task-i, $C_i$ represents process time for processing task-i, $D_i$ represents relative deadline of task-i, and $X_{k,i} = \{M_k - M_i + (M - 2M_k + 1)C_k/D_k\}/(M - 2M_i + 1)$.

13 Claims, 9 Drawing Sheets

OTHER PUBLICATIONS

Baker, "An Analysis of EDF Schedulabiilty on a Microprocessor". FSU Computer Science Technical Report TR-030202, Department of Computer Science, Florida State University, Tallahassee, FL, Feb. 7, 2003, pp. 1-16.

Liu, "Real-Time Systems", Prentice Hall, 2000, pp. 67 & 68.

Hermant et al, "Real-time fixed and dynamic priority driven scheduling algorithms: theory and experience", INRIA Technical Report, 1996, pp. 1-59.

* cited by examiner

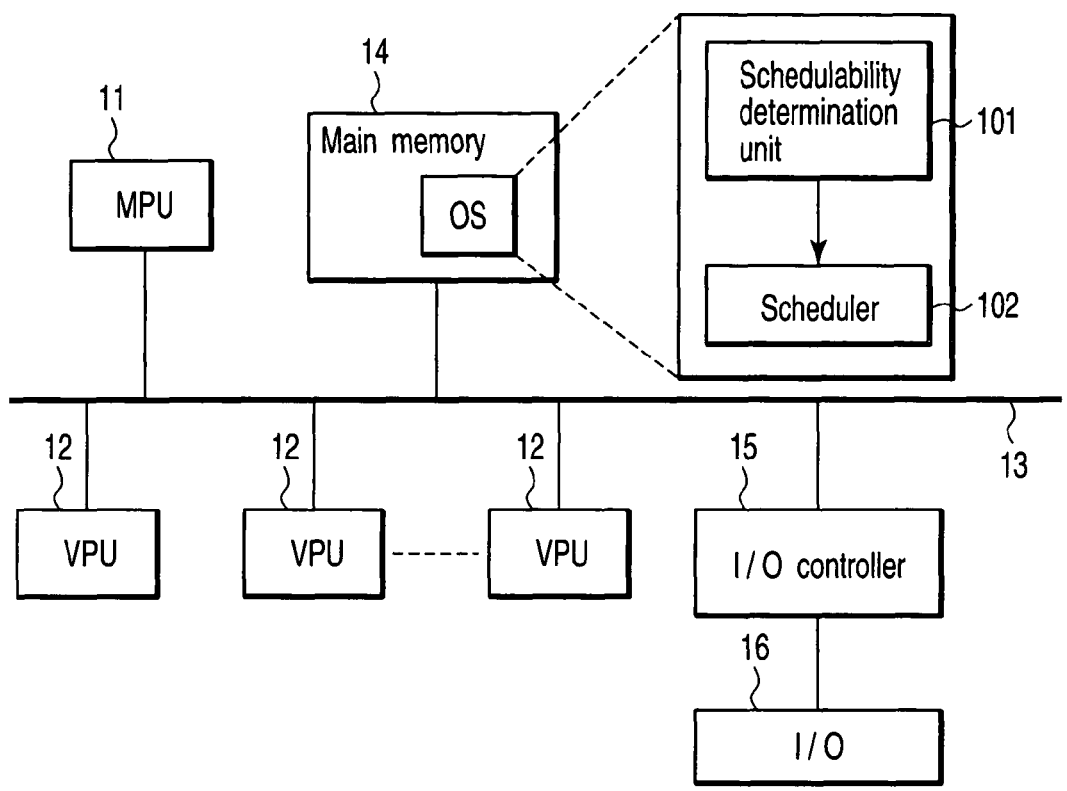
F I G. 1

REAL-TIME SCHEDULABILITY DETERMINATION METHOD AND REAL-TIME SYSTEM

CROSS-REFERENCE TO RELATED APPLICATIONS

This application is based upon and claims the benefit of priority from prior Japanese Patent Application No. 2004-093020, filed Mar. 26, 2004, the entire contents of which are incorporated herein by reference.

BACKGROUND OF THE INVENTION

1. Field of the Invention

The present invention relates to a real-time schedulability determination method for determining whether real-time scheduling of a plurality of tasks is possible using a plurality of processors, and a real-time system employing the method.

2. Description of the Related Art

Real-time systems are time-constrained computer systems in which "processing of any task must be completed within a time limit set for it".

In general, the time limit set for each task is called a "deadline", and if a task is not completed by its deadline, this is called a "deadline miss". Real-time systems must be absolutely free from deadline misses.

Air traffic control systems, plant control monitoring systems, medical systems, etc., are typical real-time systems. Air traffic control systems, for example, set a safety interval between airplanes or between an airplane and an obstacle in order to prevent collisions of airplanes. In this case, if two seconds are required to determine whether airplanes will collide with each other within a second, this is useless. Thus, air traffic control systems are under strict time constraints.

Operation of machines under strict time constraints under which deadline misses are unallowable is called "real-time scheduling". Various methods for realizing real-time scheduling have been proposed so far.

For example, a technique for performing real-time scheduling using the earliest deadline first (EDF) algorithm is known (see, for example, J. W. S. Liu, "Real-time Systems", Prentice Hall, 2000)

In real-time scheduling, it is important to assign appropriate processors to respective appropriate tasks for respective appropriate periods in order to prevent each task from occurring a deadline miss.

When real-time scheduling of a plurality of tasks using a plurality of processors is performed, it is firstly determined, using a real-time schedulability determination method, whether the processors can perform real-time scheduling of tasks, and secondly, only if such real-time scheduling is determined to be possible, it is determined, using an appropriate scheduling method, which processor, task and period should be combined.

In the EDF algorithm as a typical scheduling method, a processor is preferentially assigned at the earliest time to a task with the earliest deadline.

A real-time schedulability determination method is known in which real-time scheduling is possible using the EDF algorithm. Concerning this technique, see, for example, T. P. Baker, "An Analysis of EDF Schedulability on a Multiprocessor", FSU Computer Science Technical Report TR-030202, 2003 (this will hereinafter be referred to as "Baker").

Another real-time schedulability determination method is known in which scheduling is virtually executed to check whether a deadline miss will occur. Concerning this technique, see, for example, J. F. Hermant et al., "Real-time Fixed and Dynamic Priority Driven Scheduling Algorithms: Theory and Experience", Inria Technical Report, 1996 (this will hereinafter be referred to as "Hermant et al.").

In the description below, unless otherwise specified, real-time schedulability and non-schedulability will be referred to simply as "schedulability" and "non-schedulability", respectively.

However, in the determination method disclosed in Baker, it is assumed that only a single processor is assigned to a single task. In other words, this method does not consider a task that simultaneously requires a plurality of processor to enhance processing efficiency. Therefore, a schedulability determination method is demanded which can also be utilized when a plurality of processors are simultaneously needed to process a single task.

Furthermore, the method disclosed in Hermant et al., in which virtual scheduling is performed, is unrealistic since it requires a long calculation time.

BRIEF SUMMARY OF THE INVENTION

According to a first aspect of the invention, there is provided a schedulability determination method of determining whether real-time scheduling of a plurality of tasks is possible using a plurality of processors, comprising: calculating Lk and $\Sigma_{i=1\ldots N} Mi*Uk, i$, ($1 \leq k$, $i \leq N$; k, i: integer) where Lk corresponds to a task k which is included in the tasks, Mi represents number of the one or more processors simultaneously used by the task i, Uk, i corresponds to the task k and the task i, and N represents number of the tasks; and determining that real-time scheduling of the tasks is possible using the processors, if the tasks all satisfy a plurality of conditions, $\Sigma_{i=1\ldots N} Mi*Uk, i \leq Lk$ for all k ($1 \leq k \leq N$), wherein: Lk corresponds to a task k which is to be detected to satisfy corresponding one of the conditions, Lk being expressed as follows:

if $Mk \leq (M+1)/2$,     (1)

$Lk=(M-Mk+1)-(M-2Mk+1)Ck/Dk$; and

Uk, i is expressed as follows:

if $Mk \leq (M+1)/2$, $Mi<(M+1)/2$, and $Xk, i \leq 0$,     (1)

$Uk, i=Ci/Ti\{1+(Ti-Di)/Dk\}+Ci/Dk$, if $Mk \leq (M+1)/2$, $Mi<(M+1)/2$, and $0<Xk, i<Ci/Ti$,     (2)

$Uk, i=Ci/Ti\{1+(Ti-Di)/Dk\}+(Ci-Xk, i*Ti)/Dk$; and if $Mk \leq (M+1)/2$, $Mi<(M+1)/2$ and $Ci/Ti \leq Xk, i$,     (3)

$Uk, i=Ci/Ti\{1+(Ti-Di)/Dk\}$, where M represents number of the processors, Ti represents an interval of a task i included in the tasks, Ci represents a process time for processing the task i, Di represents a relative deadline of the task i, and $Xk, i = \{Mk-Mi+(M-2Mk+1)Ck/Dk\}/(M-2Mi+1)$.

According to a second aspect of the invention, there is provided a schedulability determination method of determining whether real-time scheduling of a plurality of tasks is possible using a plurality of processors, comprising: calculating Lk and $\Sigma_{i=1\ldots N} Mi *Uk, i$, ($1 \leq k$, $i \leq N$; k, i: integer) where Lk corresponds to a task k which is included in the tasks, Mi represents number of the one or more processors simultaneously used by the task i, Uk, i corresponds to the task k, and N represents number of the tasks; and determining that real-time scheduling of the tasks is possible using the processors, if the tasks all satisfy a plurality of conditions, $\Sigma_{i=1\ldots N} Mi*Uk, i \leq Lk$ for all k $(1 \leq k \leq N)$, wherein: Lk corresponds to a task k which is to be detected to satisfy corresponding one of the conditions, Lk being expressed as follows:

if $Mk \leq (M+1)/2$, (1)

$Lk=(M-Mk+1)-(M-2Mk+1)Ck/Dk$ if $(M+1)/2<Mk$, (2)

$Lk=M-Mk+1$; and

Uk, i is expressed as follows:

if $Mk \leq (M+1)/2$, (1)

and if $Mi<(M+1)/2$, and if Xk, i $\leq 0$, $Uk, i=Ci/Ti\{1+(Ti-Di)/Dk\}+Ci/Dk$;

if $Mk \leq (M+1)/2$, (1)

and if $Mi<(M+1)/2$, and if $0<Xk, i<Ci/Ti$, $Uk, i=Ci/Ti\{1+(Ti-Di)/Dk\}+(Ci-Xk, i*Ti)/Dk$;

if $Mk \leq (M+1)/2$, (1)

and if $Mi<(M+1)/2$, and if $Ci/Ti \leq Xk, i$, $Uk, i=Ci/Ti\{1+(Ti-Di)/Dk\}$;

if $Mk \leq (M+1)/2$, (1)

and if $Mi=(M+1)/2$, and if $Mk \neq (M+1)/2$, and if $Ck/Dk<1/2$, $Uk, i=Ci/Ti\{1+(Ti-Di)/Dk\}+Ci/Dk$;

if $Mk \leq (M+1)/2$, (1)

and if $Mi=(M+1)/2$, and if $Mk=(M+1)/2$, $Uk, i=Ci/Ti\{1+(Ti-Di)/Dk\}$;

if $Mk \leq (M+1)/2$, (1)

and if $(M+1)/2<Mi$, and if Xk, i $\leq 0$, $Uk, i=Ci/Ti\{1+(Ti-Di)/Dk\}$;

if $Mk \leq (M+1)/2$, (1)

and if $(M+1)/2<Mi$, and if $0<Xk, i$, $Uk, i=Ci/Ti\{1+(Ti-Di)/Dk\}+Ci/Dk$;

if $(M+1)/2<Mk$, (2)

and if $Mi<(M+1)/2$, and if Yk, i$<Ci/Ti$, $Uk, i=Ci/Ti\{1+(Ti-Di)/Dk\}+(Ci-Yk, i*Ti)/Dk$;

if $(M+1)/2<Mk$, (2)

and if $Mi<(M+1)/2$, and if $Ci/Ti \leq Yk, i$, $Uk, i=Ci/Ti\{1+(Ti-Di)/Dk\}$;

if $(M+1)/2<Mk$, (2)

and if $(M+1)/2 \leq Mi$, and if $Mi \leq Mk$, $Uk, i=Ci/Ti\{1+(Ti-Di)/Dk\}$;

if $(M+1)/2<Mk$, (2)

and if $(M+1)/2 \leq Mi$, and if $Mk<Mi$, $Uk, i=Ci/Ti\{1+(Ti-Di)/Dk\}+Ci/Dk$;

where M represents number of the processors, Ti represents an interval of a task i included in the tasks, Ci represents a process time for processing the task i, Di represents a relative deadline of the task i, and Xk, i=$\{Mk-Mi+(M-2Mk+1)Ck/Dk\}/(M-2Mi+1)$, Yk, i=$(Mk-Mi)/(M-2Mi+1)$.

According to a third aspect of the invention, there is provided a schedulability determination method of determining whether real-time scheduling of a plurality of tasks is possible using a plurality of processors, comprising: (1) acquiring task parameter information indicating an interval of each of the tasks, number of the one or more processors simultaneously used by the each task, a processing time of the each task, and a relative deadline of the each task; (2) calculating a minimum average load which causes a deadline miss in a task to be detected whether to raise the deadline miss, which is included in the tasks, based on the task parameter information corresponding to the task to be detected, and total number of the processors; (3) calculating, based on the task parameter information corresponding to the each task, a total of maximum average loads of the tasks which are generated in a period ranging from an earliest time at which an average load is not less than the calculated minimum average load, to a time at which the task to be detected raises a deadline miss; (4) repeating (2) calculating the minimum average load and (3) calculating the total, while changing the task to be detected; and (5) determining that real-time scheduling of the tasks is possible using the processors, if the calculated total is greater than the calculated minimum average load.

According to a fourth aspect of the invention, there is provided a real-time system comprising: a plurality of processors; a calculating unit configured to calculate Lk and $\Sigma_{i=1\ldots N} Mi*Uk, i$ $(1 \leq k, i \leq N$; k, i: integer) for each of a plurality of tasks as real-time scheduling targets where Lk corresponds to a task k which is included in the tasks, Mi represents number of the one or more processors simultaneously used by the task i, Uk, i corresponds to the task k, and N represents number of the tasks; a determining unit configured to determine that real-time scheduling of the tasks is possible using the processors, if the tasks all satisfy a plurality of conditions, $\Sigma_{i=1 \ldots N} Mi*Uk, i \leq Lk$ for all k ($1 \leq k \leq N$); and a performing unit configured to perform real-time scheduling of the tasks using the processors, if the determining unit determines that the real-time scheduling is possible, wherein: Lk corresponds to a task k which is to be detected to satisfy corresponding one of the conditions, Lk being expressed as follows:

if $Mk \leq (M+1)/2$, (1)

$Lk=(M-Mk+1)-(M-2Mk+1)Ck/Dk$; and

Uk, i is expressed as follows:

if $Mk \leq (M+1)/2$, $Mi<(M+1)/2$, and $Xk, i \leq 0$, (1)

$Uk, i=Ci/Ti\{1+(Ti-Di)/Dk\}+Ci/Dk$, if $Mk \leq (M+1)/2$, $Mi<(M+1)/2$, and $0<Xk, i<Ci/Ti$, (2)

$Uk, i=Ci/Ti\{1+(Ti-Di)/Dk\}+(Ci-Xk, i*Ti)/Dk$; and if $Mk \leq (M+1)/2$, $Mi<(M+1)/2$ and $Ci/Ti \leq Xk, i$, (3)

$Uk, i=Ci/Ti\{1+(Ti-Di)/Dk\}$, where M represents number of the processors, Ti represents an interval of a task i included in the tasks, Ci represents a process time for processing the task i, Di represents a relative deadline of the task i, and $Xk, i=\{Mk-Mi+(M-2Mk+1)Ck/Dk\}/(M-2Mi+1)$.

According to a fifth aspect of the invention, there is provided a real-time system comprising: a plurality of processors; a calculating unit configured to calculate Lk and $\Sigma_{i=1 \ldots N} Mi*Uk, i$ ($1 \leq k, i \leq N$; k, i: integer) where Lk corresponds to a task k which is included in the tasks, Mi represents number of the one or more processors simultaneously used by the task i, Uk, i corresponds to the task k, and N represents number of the tasks; a determining unit configured to determine that real-time scheduling of the tasks is possible using the processors, if the tasks all satisfy a plurality of conditions, $\Sigma_{i=1 \ldots N} Mi*Uk, i \leq Lk$ for all k ($1 \leq k \leq N$); and a performing unit configured to perform real-time scheduling of the tasks using the processors, if the determining unit determines that the real-time scheduling is possible, wherein: Lk corresponds to a task k which is to be detected to satisfy corresponding one of the conditions, Lk being expressed as follows:

if $Mk \leq (M+1)/2$, (1)

$Lk=(M-Mk+1)-(M-2Mk+1)Ck/Dk$ if $(M+1)/2<Mk$, (2)

$Lk=M-Mk+1$; and

Uk, i is expressed as follows:

if $Mk \leq (M+1)/2$, (1)

and if $Mi<(M+1)/2$, and if $Xk, i \leq 0$, $Uk, i=Ci/Ti\{1+(Ti-Di)/Dk\}+Ci/Dk$;

if $Mk \leq (M+1)/2$, (1)

and if $Mi<(M+1)/2$, and if $0<Xk, i<Ci/Ti$, $Uk, i=Ci/Ti\{1+(Ti-Di)/Dk\}+(Ci-Xk, i*Ti)/Dk$;

if $Mk \leq (M+1)/2$, (1)

and if $Mi<(M+1)/2$, and if $Ci/Ti \leq Xk, i$, $Uk, i=Ci/Ti\{1+(Ti-Di)/Dk\}$;

if $Mk \leq (M+1)/2$, (1)

and if $Mi=(M+1)/2$, and if $Mk \neq (M+1)/2$, and if $Ck/Dk<1/2$, $Uk, i=Ci/Ti\{1+(Ti-Di)/Dk\}+Ci/Dk$;

if $Mk \leq (M+1)/2$, (1)

and if $Mi=(M+1)/2$, and if $Mk=(M+1)/2$, $Uk, i=Ci/Ti\{1+(Ti-Di)/Dk\}$;

if $Mk \leq (M+1)/2$, (1)

and if $(M+1)/2<Mi$, and if $Xk, i \leq 0$, $Uk, i=Ci/Ti\{1+(Ti-Di)/Dk\}$;

if $Mk \leq (M+1)/2$, (1)

and if $(M+1)/2<Mi$, and if $0<Xk, i$, $Uk, i=Ci/Ti\{1+(Ti-Di)/Dk\}+Ci/Dk$;

if $(M+1)/2<Mk$, (2)

and if $Mi<(M+1)/2$, and if $Yk, i<Ci/Ti$, $Uk, i=Ci/Ti\{1+(Ti-Di)/Dk\}+(Ci-Yk, i*Ti)/Dk$;

if $(M+1)/2<Mk$, (2)

and if $Mi<(M+1)/2$, and if $Ci/Ti \leq Yk, i$, $Uk, i=Ci/Ti\{1+(Ti-Di)/Dk\}$;

if $(M+1)/2<Mk$, (2)

and if $(M+1)/2 \leq Mi$, and if $Mi \leq Mk$, $Uk, i=Ci/Ti\{1+(Ti-Di)/Dk\}$;

if $(M+1)/2<Mk$, (2)

and if $(M+1)/2 \leq Mi$, and if $Mk \leq Mi$, $Uk, i=Ci/Ti\{1+(Ti-Di)/Dk\}+Ci/Dk$;

where M represents number of the processors, Ti represents an interval of a task i included in the tasks, Ci represents a process time for processing the task i, Di represents a relative deadline of the task i, and $Xk, i=\{Mk-Mi+(M-2Mk+1)Ck/Dk\}/(M-2Mi+1)$, $Yk, i=(Mk-Mi)/(M-2Mi+1)$.

According to a sixth aspect of the invention, there is provided a real-time system comprising: a plurality of processors; an acquiring unit configured to acquire task parameter information indicating an interval of each of a plurality of tasks, number of one or more processors included in the processors and simultaneously used by the each task, a processing time of the each task, and a relative deadline of the each task; a first calculating unit configured to calculate a minimum average load which causes a deadline miss in a task to be detected whether to raise the deadline miss, which is included in the tasks, based on the task parameter information corresponding to the task to be detected, and total number of the processors; a second calculating unit configured to calculate, based on the task parameter information corresponding to the each task, a total of maximum average loads of the tasks which are generated in a period ranging from an earliest time at which an average load is not less than the calculated minimum average load, to a time at which the task to be detected raises a deadline miss; a performing unit configured to perform real-time scheduling of the tasks using the processors, if the calculated total is greater than the calculated minimum average load.

According to a seventh aspect of the invention, there is provided a program stored in a computer readable medium, and executing a schedulability determination process for determining whether real-time scheduling of a plurality of tasks is possible using a plurality of processors, comprising: means for instructing the computer to calculate Lk and $\Sigma_{i=1...N} Mi*Uk, i$, ($1 \leq k, i \leq N$; k, i: integer) where Lk corresponds to a task k which is included in the tasks, Mi represents number of the one or more processors simultaneously used by the task i, Uk, i corresponds to the task k, and N represents number of the tasks; and means for instructing the computer to determine that real-time scheduling of the tasks is possible using the processors, if the tasks all satisfy a plurality of conditions, $\Sigma_{i=1...N} Mi*Uk, i \leq Lk$ for all k ($1 \leq k \leq N$), wherein: Lk corresponds to a task k which is to be detected to satisfy corresponding one of the conditions, Lk being expressed as follows:

if $Mk \leq (M+1)/2$, (1)

$Lk=(M-Mk+1)-(M-2Mk+1)Ck/Dk$; and

Uk, i is expressed as follows:

if $Mk \leq (M+1)/2$, $Mi<(M+1)/2$, and $Xk, i \leq 0$, (1)

$Uk, i=Ci/Ti\{1+(Ti-Di)/Dk\}+Ci/Dk$, if $Mk \leq (M+1)/2$, $Mi<(M+1)/2$, and $0<Xk, i<Ci/Ti$, (2)

$Uk, i=Ci/Ti\{1+(Ti-Di)/Dk\}+(Ci-Xk, i*Ti)/Dk$; and if $Mk \leq (M+1)/2$, $Mi<(M+1)/2$ and $Ci/Ti \leq Xk, i$, (3)

$Uk, i=Ci/Ti\{1+(Ti-Di)/Dk\}$, where M represents number of the processors, Ti represents an interval of a task i included in the tasks, Ci represents a process time for processing the task i, Di represents a relative deadline of the task i, and $Xk, i=\{Mk-Mi+(M-2Mk+1)Ck/Dk\}/(M-2Mi+1)$.

According to a eighth aspect of the invention, there is provided a program stored in a computer readable medium, and executing a schedulability determination process for determining whether real-time scheduling of a plurality of tasks is possible using a plurality of processors, comprising: means for instructing the computer to calculate Lk and $\Sigma_{i=1...N} Mi*Uk, i$, ($1 \leq k, i \leq N$; k, i: integer) where Lk corresponds to a task k which is included in the tasks, Mi represents number of the one or more processors simultaneously used by the task i, Uk, i corresponds to the task k, and N represents number of the tasks; and means for instructing the computer to determine that real-time scheduling of the tasks is possible using the processors, if the tasks all satisfy a plurality of conditions, $\Sigma_{i=1...N} Mi*Uk, i \leq Lk$ for all k ($1 \leq k \leq N$), wherein: Lk corresponds to a task k which is to be detected to satisfy corresponding one of the conditions, Lk being expressed as follows:

if $Mk \leq (M+1)/2$, (1)

$Lk=(M-Mk+1)-(M-2Mk+1)Ck/Dk$ if $(M+1)/2<Mk$, (2)

$Lk=M-Mk+1$; and

Uk, i is expressed as follows:

if $Mk \leq (M+1)/2$, (1)

and if $Mi<(M+1)/2$, and if $Xk, i \leq 0$, $Uk, i=Ci/Ti\{1+(Ti-Di)/Dk\}+Ci/Dk$;

if $Mk \leq (M+1)/2$, (1)

and if $Mi<(M+1)/2$, and if $0<Xk, i<Ci/Ti$, $Uk, i=Ci/Ti\{1+(Ti-Di)/Dk\}+(Ci-Xk, i*Ti)/Dk$;

if $Mk \leq (M+1)/2$, (1)

and if $Mi<(M+1)/2$, and if $Ci/Ti \leq Xk, i$, $Uk, i=Ci/Ti\{1+(Ti-Di)/Dk\}$;

if $Mk \leq (M+1)/2$, (1)

and if $Mi=(M+1)/2$, and if $Mk \neq (M+1)/2$, and if $Ck/Dk<1/2$, $Uk, i=Ci/Ti\{1+(Ti-Di)/Dk\}+Ci/Dk$;

if $Mk \leq (M+1)/2$, (1)

and if $Mi=(M+1)/2$, and if $Mk=(M+1)/2$, $Uk, i=Ci/Ti\{1+(Ti-Di)/Dk\}$;

if $Mk \leq (M+1)/2$, (1)

and if $(M+1)/2<Mi$, and if $Xk, i \leq 0$, $U_{k,i} = C_i/T_i\{1+(T_i-D_i)/D_k\};$ if $M_k \leq (M+1)/2,$ (1)

and if $(M+1)/2 < M_i,$ and if $0 < X_{k,i},$ $U_{k,i} = C_i/T_i\{1+(T_i-D_i)/D_k\} + C_i/D_k;$ if $(M+1)/2 < M_k,$ (2)

and if $M_i < (M+1)/2,$ and if $Y_{k,i} < C_i/T_i,$ $U_{k,i} = C_i/T_i\{1+(T_i-D_i)/D_k\} + (C_i - Y_{k,i}*T_i)/D_k;$ if $(M+1)/2 < M_k,$ (2)

and if $M_i < (M+1)/2,$ and if $C_i/T_i \leq Y_{k,i},$ $U_{k,i} = C_i/T_i\{1+(T_i-D_i)/D_k\};$ if $(M+1)/2 < M_k,$ (2)

and if $(M+1)/2 \leq M_i,$ and if $M_i \leq M_k,$ $U_{k,i} = C_i/T_i\{1+(T_i-D_i)/D_k\};$ if $(M+1)/2 < M_k,$ (2)

and if $(M+1)/2 \leq M_i,$ and if $M_k < M_i,$ $U_{k,i} = C_i/T_i\{1+(T_i-D_i)/D_k\} + C_i/D_k;$ where M represents number of the processors, $T_i$ represents an interval of a task i included in the tasks, $C_i$ represents a process time for processing the task i, $D_i$ represents a relative deadline of the task i, and $X_{k,i} = \{M_k - M_i + (M-2M_k+1)C_k/D_k\}/(M-2M_i+1)$, $Y_{k,i} = (M_k - M_i)/(M-2M_i+1)$.

According to a ninth aspect of the invention, there is provided a program stored in a computer readable medium, and executing a schedulability determination process for determining whether real-time scheduling of a plurality of tasks is possible using a plurality of processors, comprising: (1) means for instructing the computer to acquire task parameter information indicating an interval of each of the tasks, number of the one or more processors simultaneously used by the each task, a processing time of the each task, and a relative deadline of the each task; (2) means for instructing the computer to calculate a minimum average load which causes a deadline miss in a task to be detected whether to raise the deadline miss, which is included in the tasks, based on the task parameter information corresponding to the task to be detected, and total number of the processors; (3) means for instructing the computer to calculate, based on the task parameter information corresponding to the each task, a total of maximum average loads of the tasks which are generated in a period ranging from an earliest time at which an average load is not less than the calculated minimum average load, to a time at which the task to be detected raises a deadline miss; (4) means for instructing the computer to repeat (2) the calculation of the minimum average load and (3) the calculation of the total, while changing the task to be detected; and (5) means for instructing the computer to determine that real-time scheduling of the tasks is possible using the processors, if the calculated total is greater than the calculated minimum average load.

BRIEF DESCRIPTION OF THE SEVERAL VIEWS OF THE DRAWING

FIG. 1 is a block diagram illustrating a configuration example of a real-time system according to an embodiment of the invention;

DETAILED DESCRIPTION OF THE INVENTION

Figure 2:
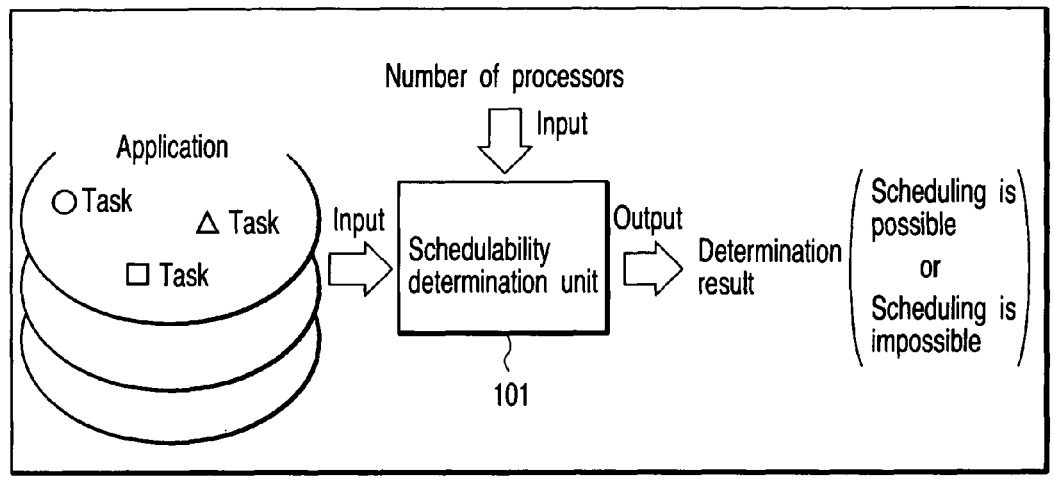
FIG. 2 is a view useful in explaining the operation of a schedulability determination unit incorporated in the real-time system of the embodiment.

An embodiment of the invention will be described in detail with reference to the accompanying drawings.

FIG. 1 shows a configuration example of a real-time system according to an embodiment of the invention. The real-time system is, for example, a computer system used as an embedded system, and executes, in real-time, a plurality of tasks under time constraints.

The real-time system comprises a master processing unit (MPU) 11, a plurality of versatile processing units (VPUs) 12, a bus 13, a main memory 14, an input/output (I/O) controller 15 and an I/O device 16. The MPU 11, VPUs 12, main memory 14 and I/O controller 15 are connected to each other by the bus 13.

The MPU 11 is a main processor for controlling the entire operation of the real-time system, and is arranged to execute an operating system (OS) stored in the main memory 14. Each VPU 12 is a processor for executing various processes under the control of the MPU 11. A plurality of tasks that should be processed in real-time are executed by the VPUs 12. Each of these tasks simultaneously requires one or more processors. The operating system assigns one or more VPUs 12 to each task in real-time. The operating system includes a schedulability determination unit 101 and scheduler 102.

The schedulability determination unit 101 executes a schedulability determination process for determining whether the VPUs 12 can perform real-time scheduling, using, for example, the EDF algorithm, on a plurality of tasks that should be processed in real-time. If it is determined that such real-time scheduling is possible, the scheduler 102 causes the VPUs 12 to perform real-time scheduling on the tasks, using, for example, the EDF algorithm. As described above, in the EDF algorithm, a processor is preferentially assigned to a task with the earliest deadline at the earliest time.

The schedulability determination process is performed when, for example, execution of a certain application program is requested. In this case, the schedulability determination unit 101 determines whether there is a possibility of occurrence of a deadline miss in each of tasks that include tasks in the requested application program, and tasks in the already executed application program. If it is determined that none of the tasks has a possibility of a deadline miss, the scheduler 102 starts scheduling of all tasks. In contrast, if it is determined that at least one of the tasks has a possibility of a deadline miss, scheduling of the tasks in the application program, execution of which is requested, is not executed. The already executed application program is continued. As a result, occurrence of a deadline miss can be avoided.

FIG. 2 shows the flow of data when the schedulability determination process is executed.

The schedulability determination unit 101 reads the total number of processors that can be used for scheduling, and task parameter information corresponding to all tasks to be scheduled. Task parameter information for each task is transferred from the corresponding application program to the schedulability determination unit 101. In the embodiment, the total number of processors indicates the number of VPUs 12 provided in the real-time system.

Task parameter information corresponding to each task includes the interval of each task, the number of processors simultaneously used for each task, the processing time (execution period) of each task, the relative deadline of each task, etc. The interval indicates the time intervals at which each task is repeatedly executed. The number of processors simultaneously used for each task is the number of processors to be simultaneously assigned to each task, and is predetermined. The processing time (execution period) indicates the time required for processing (executing) each task.

Using the total number of processors, task parameter information corresponding to all tasks to be scheduled, the schedulability determination unit 101 executes the schedulability determination process. After that, the schedulability determination unit 101 supplies the scheduler 102 with a determination result (whether scheduling is possible or impossible).

A description will be given of tasks.

Each task is a repetition of a task execution unit called a "job", and each job is started in units of "intervals". Further, each job is executed from a job start time for the "processing time" within a period equal to the "relative deadline", simultaneously using the same number of processors as assigned to each job. The time acquired by adding the relative deadline to the job start time (i.e., the time at which each job must be completed) will hereinafter be referred to as "the absolute deadline".

Figure 3:
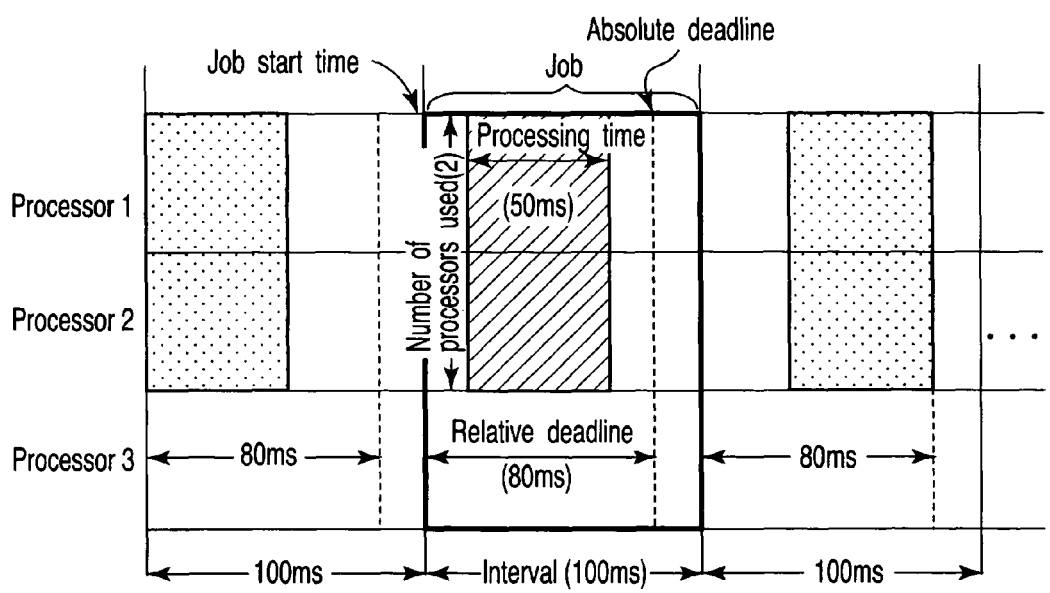
FIG. 3 is a view useful in explaining a task to be executed by the real-time system of the embodiment.

FIG. 3 shows an example of a task.

In FIG. 3, the horizontal axis indicates time, and the vertical axis indicates processors. Specifically, FIG. 3 shows a case where a certain task with an interval of 100 ms, two processors assigned, processing time of 50 ms and a relative deadline of 80 ms is executed in a real-time system in which the total number of processors (VPUs) usable for scheduling is 3.

FIG. 3 shows the execution of the task by three intervals. In each interval, a job of a processing time of 50 ms, which simultaneously uses two processors, is executed. In the case of FIG. 3, each job is processed within a period ranging from the job start time to the absolute deadline (i.e., no deadline miss occurs).

In the description below, assume, unless otherwise specified, that M represents the total number of processors usable for execution of all tasks, N represents the total number of the tasks to be scheduled, and task numbers 1 to N are attached to respective N tasks. Further, assume that $T_i$, $M_i$, $C_i$ and $D_i$ represent the interval of task i ($1 \leq i \leq N$), the number of processors simultaneously used for task i, the processing time of task i, and the relative deadline for task i, respectively.

A description will now be given of the outline of the procedure of the schedulability determination process.

Figure 4:
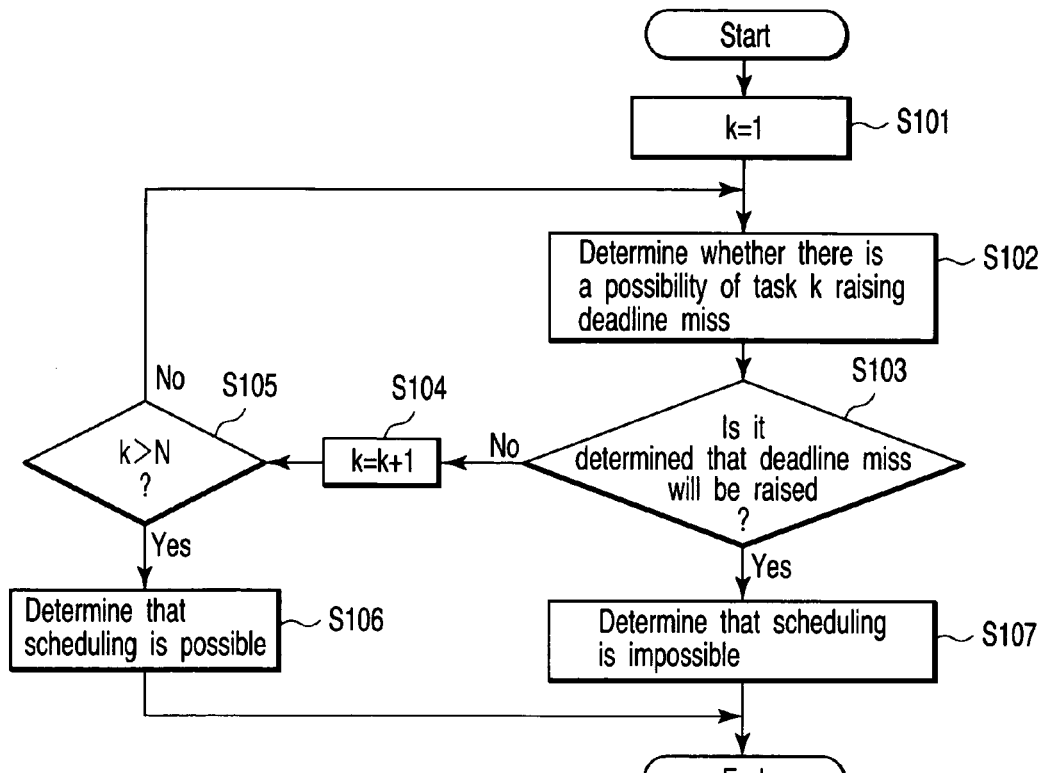
FIG. 4 is a first flowchart illustrating the procedure of a schedulability determination process executed by the real-time system of the embodiment.

FIG. 4 is a flowchart illustrating the procedure of a process for determining whether a plurality of tasks can be scheduled by a plurality of processors, using the EDF algorithm.

The schedulability determination unit 101 pays attention to an arbitrary target task (in the flowchart, task k ($1 \leq k \leq N$)), and determines whether this task may cause a deadline miss (steps S101 to S103). While sequentially changing the target task k (steps S104 and S105), the schedulability determination unit 101 repeats the determination.

If the schedulability determination unit 101 determines that no tasks may raise a deadline miss (YES at step S105), then it determines that scheduling is possible (step S106). In contrast, if the schedulability determination unit 101 determines that at least one task may raise a deadline miss (YES at step S103), then it determines that scheduling is impossible (step S107).

If the schedulability determination unit 101 determines that scheduling is possible, real-time scheduling using the EDF algorithm can be executed without raising a deadline miss.

In the embodiment, a condition established whenever a task raises a deadline miss is utilized, and it is determined that there is a possibility of a deadline miss, if the condition is established.

Figure 5:
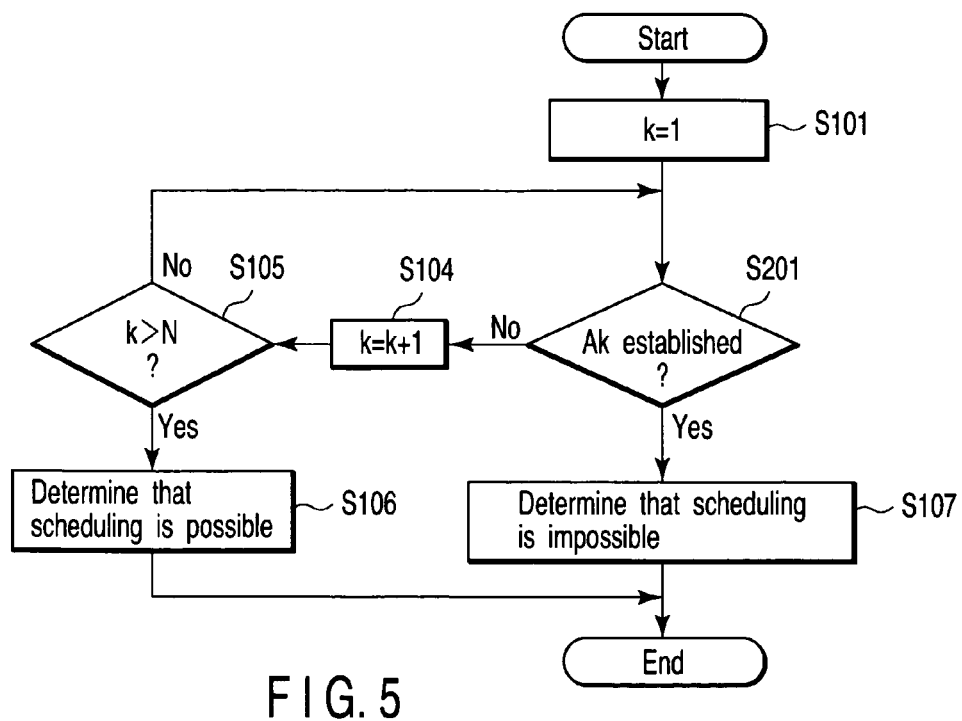
FIG. 5 is a second flowchart illustrating the procedure of the schedulability determination process executed by the real-time system of the embodiment.

FIG. 5 is a flowchart acquired by rewriting the flowchart of FIG. 4 using the above-mentioned condition.

In the flowchart of FIG. 5, the condition established whenever task k raises a deadline miss is represented by $A_k$. Since the condition differs between tasks, subscript "k" is attached thereto. In the flowchart of FIG. 5, the schedulability determination unit 101 determines whether $A_k$ is established (step S201), thereby determining whether task k may raise a deadline miss when scheduling using the EDF algorithm is executed.

More specifically, the condition established whenever task k raises a deadline miss is represented by the inequality $L_k < U_k$ described below. Since the left and right hand sides of the inequality differ between tasks, subscript "k" is attached thereto.

Figure 7:
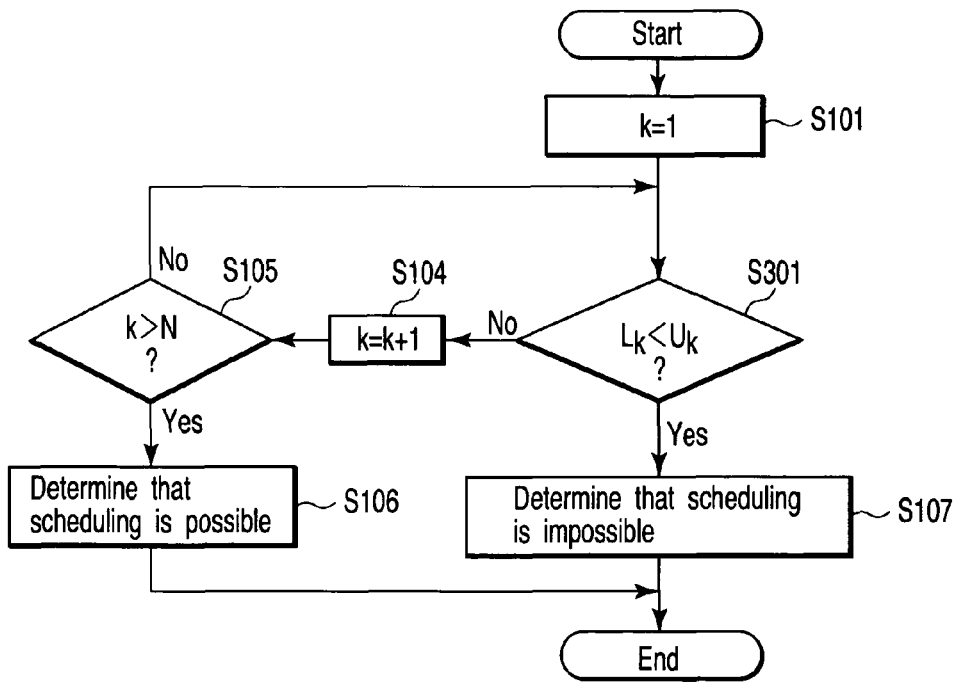
FIG. 7 is a third flowchart illustrating the procedure of the schedulability determination process executed by the real-time system of the embodiment.

FIG. 7 is a flowchart acquired by rewriting the flowchart of FIG. 5 using the inequality Lk<Uk. In the flowchart of FIG. 7, the schedulability determination unit 101 determines whether Lk<Uk is satisfied (step S301), thereby determining whether there is a possibility of a deadline miss in task k.

The condition Lk<Uk established whenever a task raises a deadline miss will be described first roughly and then in detail.

The condition will be described roughly first.

A deadline miss occurs when the load of all tasks scheduled exceeds the processing capacity of the real-time system. Therefore, the load will firstly be defined. The definition of the load plays an important role in explaining Lk and Uk.

A strict definition will be given of the load.

Assume here that a plurality of tasks are executed using a plurality of processors. Pay attention to arbitrary period T, and to those of jobs included in certain task i, which have their respective absolute deadlines within period T. The sum of the processing times of these jobs within period T is defined as the "single load time" of task i.

Further, the value acquired by multiplying the number of processors assigned to task i by the single load time of task i is defined as a "single load". The "single load" of task i occurs when task i is executed.

From the definitions of the "single load time" and "single load", the execution period of a certain job included in task i is not included in the "single load time" of task i unless the absolute deadline of the job falls within period T, even if the job is executed within period T.

Further, the sum of the "single loads" of all tasks is defined as a "total load".

If the "single load time", "single load" and "total load" are divided by the period, various average times can be acquired.

In the description, the following are defined:

An "average single load time" is acquired by dividing the "single load time" by period T;

An "average single load" is acquired by dividing the "single load" by period T; and An "average load" is acquired by dividing the "total load" by period T.

Pay attention now to, for example, period [T, T+Δ). Symbol "[" means "not less than", and symbol ")" means "less than". In other words, period [T, T+Δ) indicates the period starting at time T and ending immediately before time T+Δ.

Figure 6:
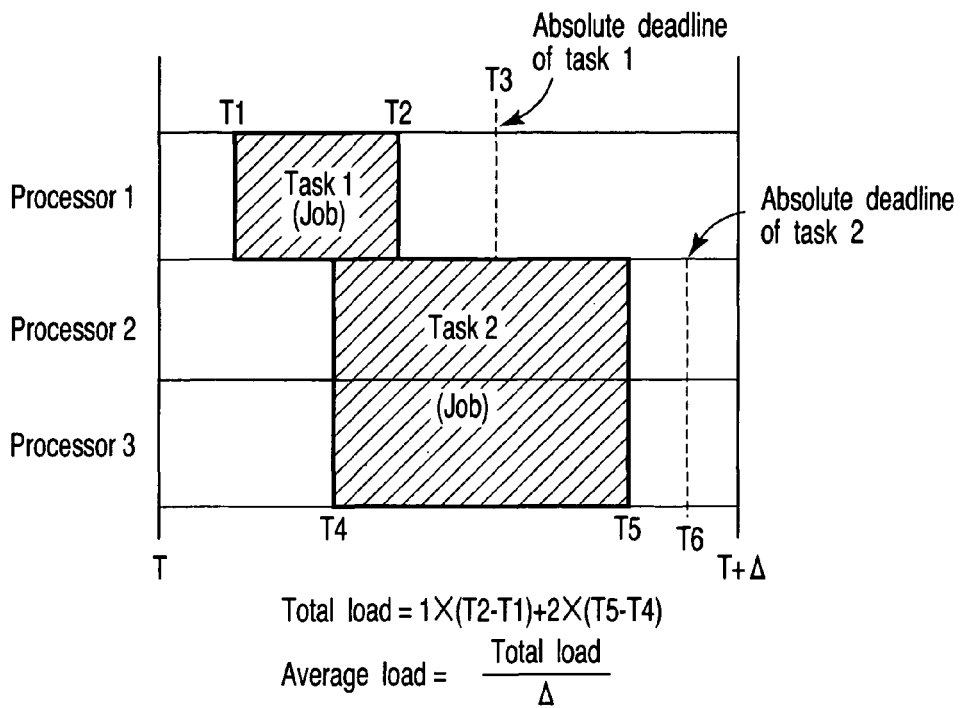
FIG. 6 is a view useful in explaining a load example on the real-time system of the embodiment.

Assuming that N, Mi and Ei represent the number of tasks, the number of processors simultaneously used for task i, and the single load time of task i, respectively, the following can be calculated:

The single load time of task i in period [T, T+Δ)=Ei
The single load of task i in period [T, T+Δ)=Mi*Ei
The total load of all tasks in period [T, T+Δ)= $\Sigma_{i=1,...,N}(Mi*Ei)$
The average single load time of task i in period [T, T+Δ)=Ei/Δ
The average single load of task i in period [T, T+Δ)=Mi*Ei/Δ
The average load of all tasks in period [T, T+Δ)= $\{\Sigma_{i=1,...,N}(Mi*Ei)\}/\Delta$ FIG. 6 shows examples of loads.

In FIG. 6, the horizontal axis indicates time, and the vertical axis indicates processors. Specifically, FIG. 6 shows a case where tasks 1 and 2 are executed within period [T, T+Δ) in a real-time system in which the total number of processors (VPUs) usable for scheduling is 3. Absolute deadline T3 for task 1 falls within period [T, T+Δ). Task 1 is executed by processor 1 during a period ranging from time T1 to time T2. Absolute deadline T6 for task 2 also falls within period [T, T+Δ). Task 2 is executed by two processors 2 and 3 during a period ranging from time T4 to time T5. Assume that there is no task, other than tasks 1 and 2, which has an absolute deadline within period [T, T+Δ).

In FIG. 6:
The single load time of task 1=T2−T1
The single load of task 1=1*(T2−T1)
The single load time of task 2=T5−T4
The single load of task 2=2*(T5−T4)
The total load=1*(T2−T1)+2*(T5−T4)
The average single load time of task 1=(T2−T1)/Δ
The average single load of task 1=1*(T2−T1)/Δ
The average single load time of task 2=(T5−T4)/Δ
The average single load of task 2=2*(T5−T4)/Δ
The average load={1*(T2−T1)+2*(T5−T4)}/Δ

As will be described below in detail, whenever certain task k raises a deadline miss, Lk is equal to or lower than the average load of all tasks in a certain period, and Uk is higher than the average load of all tasks in the certain period. In other words, whenever task k raises a deadline miss, Lk<Uk is established. The schedulability determination unit 101 determines whether Lk<Uk is established, thereby determining whether there is a possibility of task k raising a deadline miss.

Lk and Uk will now be defined.

Firstly, Lk is defined as "a value that is uniquely determined for each task k, and it is guaranteed that when task k raises a deadline miss, there is a period in which the average load is equal to or higher than this value".

Lk is defined as "a value not less than which the actual average load in a certain period is necessarily set", when task k raises a deadline miss. Lk≦actual load is established. Note that Lk can be determined from parameter information and the total number M of processors assigned to all tasks, regardless of whether task k raises a deadline miss.

The value of Lk assumed when task k raises a deadline miss will be hereinafter referred to as "the reference average load" for task k. "The reference average load" for task k is a value defined only when task k raises a deadline miss, and the load of task k during a period uniquely determined is not less than this value.

A "reference average load period" is defined as "a period uniquely determined when a certain task raises a deadline miss, in which the average load is not less than the reference average load".

When a certain task raises a deadline miss, the average load of all tasks can have various values between different periods. Accordingly, reference average load Lk can be selected from several alternatives.

The above definition concerning the reference average load does not define which one of the alternatives should be selected as the reference average load. Furthermore, when a certain task raises a deadline miss, one or more periods exist in which the task has an average load not less than the reference average load.

The above definition concerning the reference average load period does not define which one of the periods should be selected as the reference average load period.

Figure 8:
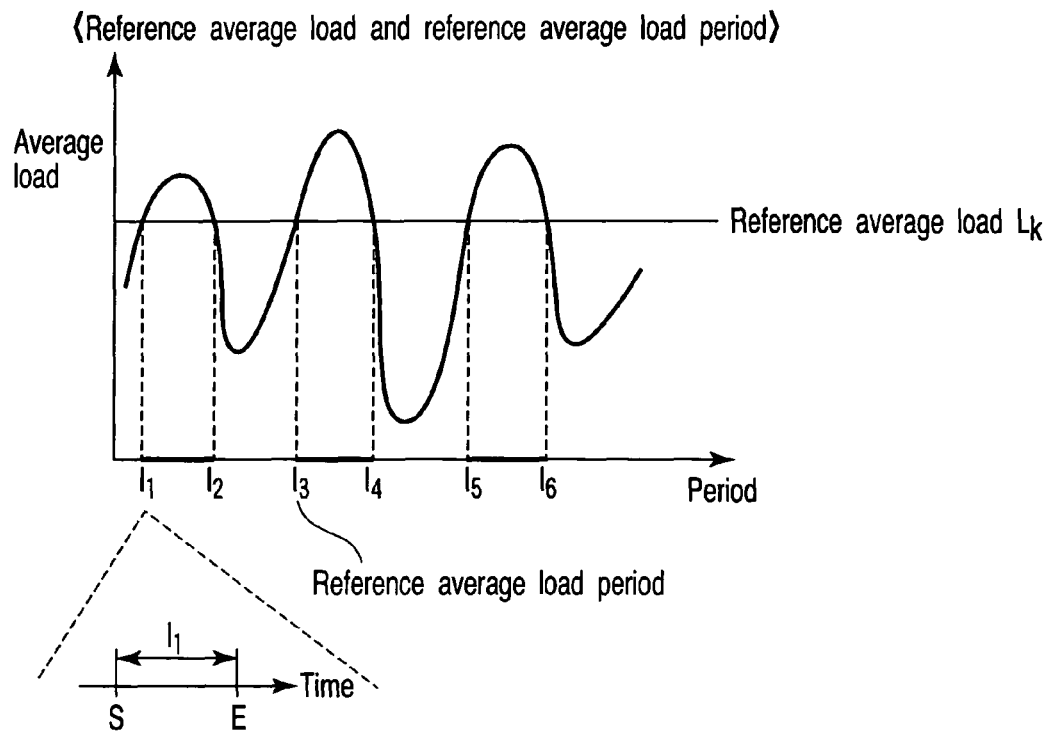
FIG. 8 is a graph useful in explaining an average load and reference average load period in the real-time system of the embodiment.

FIG. 8 shows the relationship between the reference average load and reference average load period.

In FIG. 8, the horizontal axis indicates the conceptual period, and the vertical axis indicates the reference load. Since, actually, the period is expressed two-dimensionally, using a start time S and end time E, it cannot be expressed, in a strict sense, by the one-dimensional axis (horizontal axis). It should be noted that the period expressed by the horizontal axis of FIG. 8 is merely a "conceptual" period.

In the graph of FIG. 8, the wave line indicates how the average load varies in each period when a plurality of tasks are scheduled by a plurality of processors, using the EDF algorithm. Assume here that task k raises a deadline miss at a certain time. In this case, the period in which the average load is not less than the reference average load Lk for task k necessarily exists.

In the graph of FIG. 8, assume that the average load is not less than Lk in the period between periods I1 and I2, in the period between periods I3 and I4, and in the period between periods I5 and I6.

From these periods, the reference average load period of task k is uniquely defined. In the case of FIG. 8, it is assumed that period I3, for example, is the reference average load period of task k.

Uk, i is defined as "a value uniquely determined in units of combinations of tasks k and i, and guaranteed to be not less than the average single load time of task i in the reference average load period of task k (higher than the average signal load time, if i=k), when task k raises a deadline miss".

Uk is defined as $Uk=\Sigma_{i=1,\ldots,N}(Mi*Uk, i)$.

Uk is defined as "a value less than which the actual average load in the reference average load period is necessarily set", when task k raises a deadline miss.

The relationship, actual load<Uk, is established.

When task k raises a deadline miss, an infinite number of values exist, which are not less than the average single load time of task i in the reference average load period of task k (higher than the average signal load time, if i=k).

The above definition of Uk, i does not define which ones of those values should be selected as Uk,i.

The average single load time of a certain task is not more than 1 for any task. Therefore, Uk, i can be defined, for example, as Uk, i=1.1 if i=k, and as Uk, i=1 in any other case. This is just an example. How to select Uk, i from a plurality of Uk, i candidates will be described later, together with a detailed description of the condition Lk<Uk that is established whenever a task raises a deadline miss.

Lk and Uk have been defined so far. A description will now be given of the condition Lk<Uk that is established whenever a task raises a deadline miss.

When a task raises a deadline miss, assume that [Tk, Tk+Δk) represents the reference average load period of task k, N represents the number of tasks, Mi represents the number of processors simultaneously used for task i, and Ei represents the single load time of task i in the reference average load period [Tk, Tk+Δk). In this case, the following expression can be acquired from the relationship between the reference average load and signal average load:

The average load of all tasks in the reference average load period [Tk, Tk+Δk) of task k={$\Sigma_{i=1,\ldots,N}(Mi*Ei)$}/Δk= $\Sigma_{i=1,\ldots,N}$(Mi*the average single load time of task i in the reference average load period [Tk, Tk+Δk))

Since the reference average load Lk concerning task k is not more than the average load of all tasks in the reference average load period [Tk, Tk+Δk) of task k, the following expression concerning Lk is established:

$Lk \leq$ the average load of all tasks in the reference average load period [Tk, Tk+Δk) of task k Further, Uk, i is defined as "a value uniquely determined in units of combinations of tasks k and i, and guaranteed to be not less than the average single load time of task i in the reference average load period of task k (higher than the average signal load time, if i=k)", when task k raises a deadline miss. Therefore, the following expressions (1) to (4) are established concerning Uk, i:

If i=k,

Uk, i>the average single load time of task i in the reference average load period [Tk, Tk+Δk)　　(1)

In the other case (i.e. if i≠k),

Uk, i≧the average single load time of task i in the reference average load period [Tk, Tk+Δk)　　(2)

$Uk=\Sigma_{i=1,\ldots,N}(Mi*Uk, i)$　　(3)

From the expressions (1) to (3) and the above inequality concerning Lk, the following expression (4) can be derived:

Lk<Uk　　(4)

The above guarantees that the condition Lk<Uk is established whenever task k raises a deadline miss.

A detailed description will be given of the condition established whenever task k raises a deadline miss, and employed in the embodiment.

In the above rough description of the condition Lk<Uk established whenever task k raises a deadline miss, the following points 1) to 3) are not specified:

1) In the embodiment, by what method, is Lk selected from a plurality of Lk candidates?;

2) In the embodiment, by what method, is the reference average load period selected from a plurality of reference average load period candidates? and 3) In the embodiment, by what method, is Uk,i selected from a plurality of Uk,i value candidates?

The above three methods will now be described.

In the embodiment, Lk is set to:

If $Mk \leq (M+1)/2$,　　(i)

$Lk=(M-Mk+1)-(M-2Mk+1)Ck/Dk$

If $(M+1)/2<Mk$,　　(ii)

$Lk=M-Mk+1$

As described in the rough description, Lk must be selected so that whenever task k raises a deadline miss, the period in which the average load of all tasks is not less than Lk exists.

In the following description, it will be proved that whenever task k raises a deadline miss, the period in which the average load of all tasks is not less than Lk exists.

It is sufficient if the time at which task k raises a deadline miss is-represented by Tk', thereby proving that the average load of all tasks is not less than Lk in the period [Tk'−DK, Tk').

Figure 9:
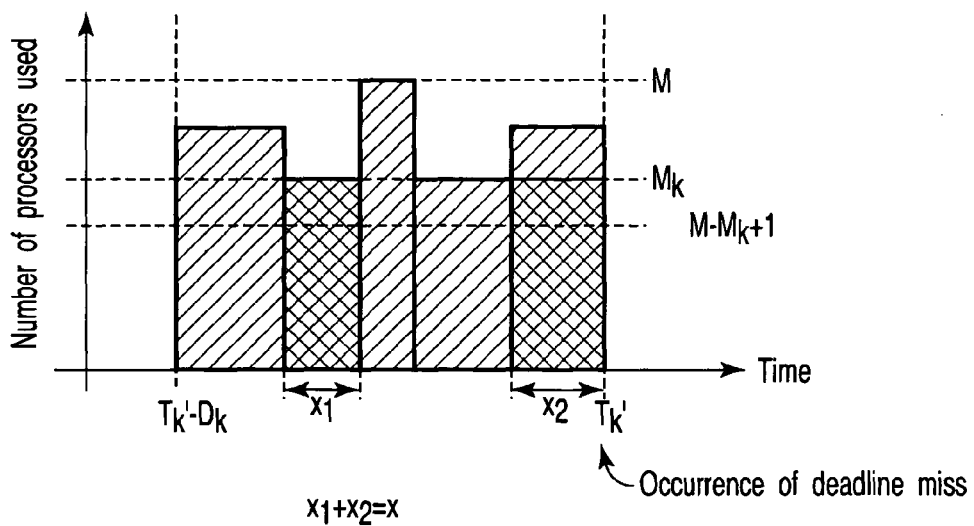
FIG. 9 is a graph illustrating execution examples of tasks assumed immediately before a deadline miss occurs.

FIG. 9 shows a case where tasks are executed in the period [Tk'−DK, Tk') immediately before task k raises a deadline miss. In FIG. 9, the horizontal axis indicates time, and the vertical axis indicates the number of processors used by all tasks. Further, in FIG. 9, the double-hatched portions indicate the execution of task k, and the single-hatched portions indicate the execution of the other tasks. Tk' is the time at which task k may raise a deadline miss, and [Tk'−DK, Tk') is the relative deadline period of task k.

Also, in this graph, in the period [Tk'−DK, Tk'), two jobs included in task k are performed, and the total x of the execution periods of the jobs is (x1+x2) (x=x1+x2).

When task k raises a deadline miss at Tk', x is smaller than the processing time Ck of task k. It can be understood from this that during the time acquired by subtracting x from Dk, Mk processors needed for processing task k could not be used. In other words, at least (M−Mk+1) processors were used for executing the tasks other than task k.

From the above, it is evident that the average load of all tasks in the period [Tk'−DK, Tk') is not less than the value given by the following expression (5):

$$\{Mk*x+(M-Mk+1)(Dk-x)\}/Dk \quad (5)$$

Since the execution period x of task k is $0 \leq x \leq Ck$, the minimum value acquired from the expression (5) is:

If $Mk \leq (M+1)/2$, $$(M-Mk+1)-(M-2Mk+1)Ck/Dk$$

If $(M+1)/2 < Mk$, $$M-Mk+1$$

These resultant values are equal to Lk.

From the above, it is proved that when task k raises a deadline miss, the period in which the average load is not less than Lk necessarily exists.

Furthermore, from the above, it can be understood that Lk corresponds to the minimum average load that may cause a deadline miss. When task k raises a deadline miss, the average load is not less than Lk in a period immediately before the deadline miss occurs (e.g., the relative deadline period of task k).

A description will be given of how to set the reference average load period.

In the embodiment, when task k raises a deadline miss, the time at which the deadline miss occurs is represented by Tk', and the longest period included in the period [Tk'−Δk', Tk'), in which the average load is not less than Lk, is set as the reference average load period. When task k raises a deadline miss, the period in which the average load is not less than Lk necessarily exists, therefore the reference average load period necessarily exists.

Figure 10:
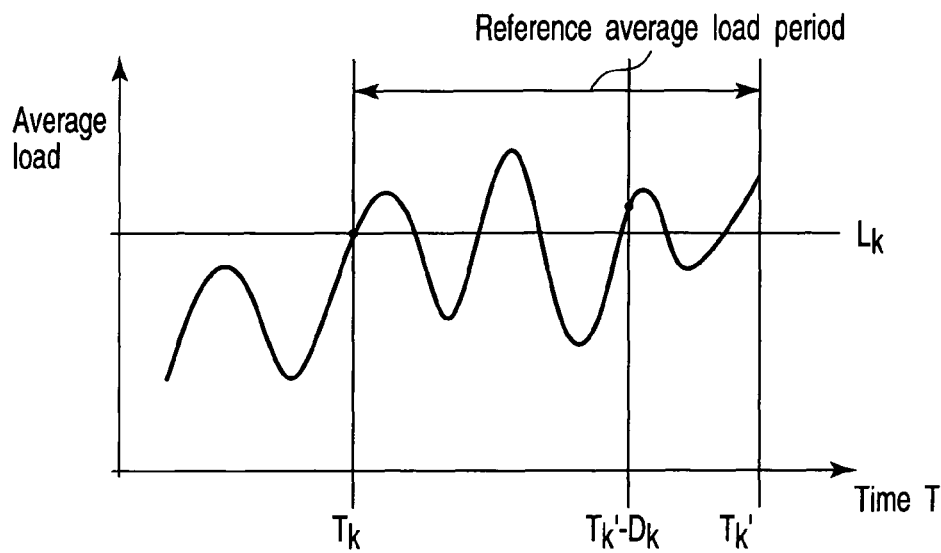
FIG. 10 is a graph useful in explaining the way of determining the reference average load period in the real-time system of the embodiment.

FIG. 10 shows an example of the reference average load period.

In FIG. 10, the horizontal axis indicates time, and the vertical axis indicates the average load. The wave line indicates the relationship between the average load and time T in period [T, Tk'). The average load in the period [T, Tk') is indicated at time point T. For example, the average indicated at time point Tk'−Dk is that in period [Tk'−Dk, Tk'). Similarly, the average indicated at time point Tk is that in period [Tk, T'). In FIG. 10, period [Tk, Tk'), which is longest among the periods in which the average load is not less than Lk, is set as the reference average load period.

In the embodiment, Uk, i is set as follows:

In the case where $Mk \leq (M+1)/2$, (1)

when $Mi < (M+1)/2$, (1-1)

if $Xk, i \leq 0$, (1-1-1)

$Uk, i = Ci/Ti\{1+(Ti-Di)/Dk\}+Ci/Dk;$ if $0 < Xk, i < Ci/Ti$, (1-1-2)

$Uk, i = Ci/Ti\{1+(Ti-Di)/Dk\}+(Ci-Xk, i*Ti)/Dk;$ if $Ci/Ti \leq Xk, i$, (1-1-3)

$Uk, i = Ci/Ti\{1+(Ti-Di)/Dk\};$ when $Mi=(M+1)/2$, (1-2)

if $Mk \neq (M+1)/2$, (1-2-1)

if $Ck/Dk < 1/2$, (1-2-1-1)

$Uk, i = Ci/Ti\{1+(Ti-Di)/Dk\}+Ci/Dk;$ if $1/2 \leq Ck/Dk$, (1-2-1-2)

$Uk, i = Ci/Ti\{1+(Ti-Di)/Dk\};$ if $Mk=(M+1)/2$, (1-2-2)

$Uk, i = Ci/Ti\{1+(Ti-Di)/Dk\};$ when $(M+1)/2 < Mi$, (1-3)

if $Xk, i \leq 0$, (1-3-1)

$Uk, i = Ci/Ti\{1+(Ti-Di)/Dk\};$ if $0 < Xk, i$, (1-3-2)

$Uk, i = Ci/Ti\{1+(Ti-Di)/Dk\}+Ci/Dk;$

In the case where $(M+1)/2 < Mk$, (2)

when $Mi < (M+1)/2$, (2-1)

if $Yk, i < Ci/Ti$, (2-1-1)

$Uk, i = Ci/Ti\{1+(Ti-Di)/Dk\}+(Ci-Yk, i*Ti)/Dk;$ if $Ci/Ti \leq Yk, i$, (2-1-2)

$Uk, i = Ci/Ti\{1+(Ti-Di)/Dk\};$ when $(M+1)/2 \leq Mi$, (2-2)

if $Mi \leq Mk$, (2-2-1)

$Uk, i = Ci/Ti\{1+(Ti-Di)/Dk\};$ if $Mk < Mi$, (2-2-2)

$Uk, i = Ci/Ti\{1+(Ti-Di)/Dk\}+Ci/Dk$ here, $Xk, i = \{Mk-Mi+(M-2Mk+1)Ck/Dk\}/(M-2Mi+1)$ $Yk, i = (Mk-Mi)/(M-2Mi+1)$ Further, in the above expressions for Uk, i, a plurality of conditions to be simultaneously satisfied are arranged in stages. For instance, the following expressions "In the case where $Mk \leq (M+1)/2$, (1)

when $Mi < (M+1)/2$, (1-1)

if $Xk, i \leq 0$, (1-1-1)

$Uk, i = Ci/Ti\{1+(Ti-Di)/Dk\}+Ci/Dk;$ if $0 < Xk, i < Ci/Ti$, (1-1-2)

$Uk, i = Ci/Ti\{1+(Ti-Di)/Dk\}+(Ci-Xk, i*Ti)/Dk"$ means the following two things A and B:

A. (1) If $Mk \leq (M+1)/2$, (1-1) if $Mi < (M+1)/2$, and (1-1-1) if $Xk, i \leq 0$, $Uk, i = Ci/Ti\{1+(Ti-Di)/Dk\}+Ci/Dk$; and B. (1) If $Mk \leq (M+1)/2$, (1-1) if $Mi < (M+1)/2$, and (1-1-2) if $0 < Xk, i < Ci/Ti$, $Uk, i = Ci/Ti\{1+(Ti-Di)/Dk\}+(Ci-Xk, i*Ti)/Dk$".

The same way of expression as the above will be also used in the description below.

As described in the rough description of the condition Lk<Uk, when task k raises a deadline miss, Uk is selected so that the average single load time of task i in the reference average load period will necessarily be not more than Uk,i (so that the average single load time of task i will necessarily be less than Uk, i, if i=k).

In the description below, it will be proved that when task k raises a deadline miss, Uk,i is not less than the average single load time of task i in the reference average load period (if i=k, Uk, i is more than the average single load time of task i).

Figure 11:
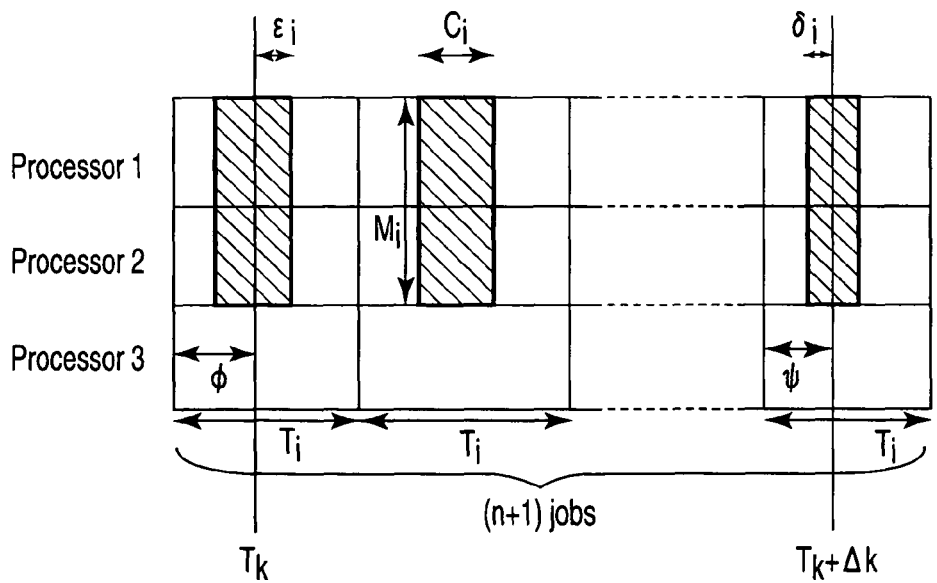
FIG. 11 is a view illustrating an execution example of task i in the reference average load period of the real-time system of the embodiment.

FIG. 11 shows an execution example of task i in the reference average load period of task k.

In FIG. 11, the horizontal axis indicates time, and the vertical axis indicates processors. Assume here that the total number of processors is 3, and period [Tk, Tk+Δk) is the reference average load period of task k.

Assume also that (n+1) jobs are included in task i with its deadline falling within the reference average load period [Tk, Tk+Δk).

In addition, assume that the execution of the first job included in the (n+1) jobs starts at time point Tk−φ and continues by a period of εi (≦Ci) within the reference average load period [Tk, Tk+Δk). Further, assume that the execution of the last job included in the (n+1) jobs starts at time point (Tk+Δk−ψ) and continues by a period of δi (if i=k, δi<Ci, and if i≠k, δi≦Ci) within the reference average load period [Tk, Tk+Δk).

The average single load time of task i in the reference average load period [Tk, Tk+Δk) is given by {εi+(n−1)*Ci+δi}/Δk If i=k, {εi+(n−1)*Ci+δi}/Δk<(εi+n*Ci)/Δk If i≠k, {εi+(n−1)*Ci+δi}/Δk≦(εi+n*Ci)/Δk Accordingly, it is sufficient if the fact that (εi+n*Ci)/Δk is not more than Uk,i is proved.

To this end, through the following procedure, the value that is not less than the maximum value of (εi+n*Ci)/Δk is calculated:

(1) The condition that maximizes (εi+n*Ci)/Δk is acquired;
(2) "The value that is not less than the maximum value of εi" is calculated; and
(3) "The value that is not less than the maximum value of (εi+n*Ci)/Δk" is calculated.

<<Condition for Maximizing (εi+n*Ci)/Δk>>

Firstly, the condition for maximizing (εi+n*Ci)/Δk will be acquired.

If the absolute deadline of the lastly starting job, included in the (n+1) jobs, is as close to (Tk+Δk) as possible, i.e., if ψ is as close to Di as possible in FIG. 11, (εi+n*Ci)/Δk is maximum.

This can be proved from the fact that assuming that (εi+n*Ci)/Δk is maximum in period [Tk, Tk+Δk) in which ψ=Di+d (d>0), the irrationality that (εi+n*Ci)/Δk is higher in period [Tk−d/2, Tk+Δk−d/2) than in period [Tk, Tk+Δk) occurs.

Further, if ψ is as close to Di as possible, n is as close to (Δk−Di+φ)/Ti as possible.

<<Calculation of the Value that is not Less Than the Maximum Value of εi>>

Subsequently, the value that is not less than the maximum value of εi will be calculated.

Assume here that 0<εi.

Figure 12:
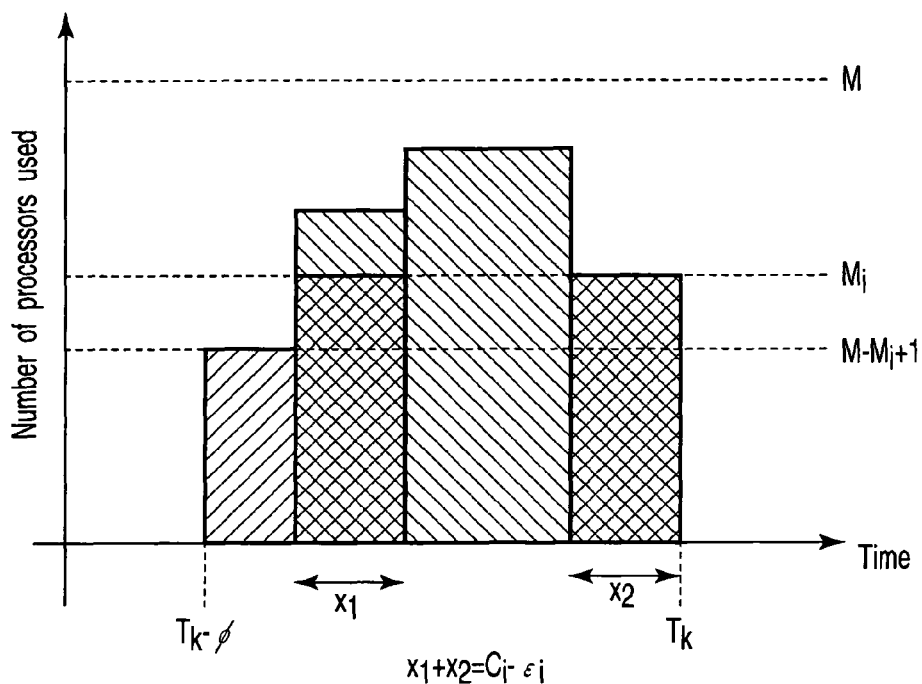
FIG. 12 is a graph illustrating execution examples of tasks in period [$T_k-\phi$, $T_k$) in FIG. 11.

FIG. 12 shows execution examples of tasks in period [Tk−φ, Tk).

In FIG. 12, the horizontal axis indicates time, and the vertical axis indicates the number of processors used by the tasks. In the graph of FIG. 12, the double-hatched portions indicate the execution of task i, and the single-hatched portions indicate the execution of the other tasks. In the case of FIG. 12, task i is executed during time (Ci−εi) in period [Tk−φ, Tk).

It can be understood from the graph that during the time (φ−Ci+εi) acquired by subtracting (Ci−εi) from φ, Mi processors needed for processing task i could not be used. In other words, at least (M−Mi+1) processors were used for executing the tasks other than task i.

From this fact, it can be detected that the load in period [Tk−φ, Tk), which is included in the total load in period [Tk−φ, Tk+Δk), is not less than {Mi*(Ci−εi)+(M−Mi+1)(φ−Ci+εi)}.

From the definition of the reference average load period that the longest one of the candidates of period [Tk'−Δk', Tk') in which the average load is not less than Lk, {Mi*(Ci−εi)+(M−Mi+1)(φ−Ci+εi)}/φ is less than the reference average load.

{Mi*(Ci−εi)+(M−Mi+1)(φ−Ci+εi)}/φ<Lk  (6)

In the above inequality, the following conditions must be considered:

Xk, i={Mk−Mi+(M−2Mk+1)Ck/Dk}/(M−2Mi+1)

Yk, i=(Mk−Mi)/(M−2Mi+1)

In this case, in the inequality (6), when Mk≦(M+1)/2,  (1)

If Mi<(M+1)/2,  (1-1)

εi<Ci−Xk, i*φ;

if Mi=(M+1)/2,  (1-2)

if Mk≠(M+1)/2,  (1-2-1)

Ck/Dk<1/2;

if Mk=(M+1)/2,  (1-2-2)

0<0;

if (M+1)/2<Mi,  (1-3)

Ci−Xk, i*φ<εi;

when (M+1)/2<Mk,  (2)

if Mi<(M+1)/2,  (2-1)

εi<Ci−Yk, i*φ;

if Mi=(M+1)/2,  (2-2)

Mk<Mi=(M+1)/2;

if (M+1)/2<Mi,  (2-3)

Ci−Yk,i*φ<εi

The above results include inequalities, such as 0<0, which is always false. This means that the assumption 0<εi itself is erroneous. If the relationship 0≦εi≦Ci is added to the results, εi can be expressed in the following manners:

When $Mk \leq (M+1)/2$, (1)

if $Mi < (M+1)/2$, (1-1)

if $Xk, i \leq 0$, (1-1-1)

$\epsilon i \leq Ci$;

if $0 < Xk, i*\phi < Ci$, (1-1-2)

$\epsilon i < Ci - Xk, i*\phi$;

if $Ci \leq Xk, i*\phi$, (1-1-3)

$\epsilon i = 0$;

if $Mi = (M+1)/2$, (1-2)

if $Mk \neq (M+1)/2$, (1-2-1)

if $Ck/Dk < 1/2$, (1-2-1-1)

$\epsilon i \leq Ci$;

if $1/2 \leq Ck/Dk$, (1-2-1-2)

$\epsilon i = 0$;

if $Mk = (M+1)/2$, (1-2-2)

$\epsilon i = 0$;

if $(M+1)/2 < Mi$, (1-3)

if $Xk, i \leq 0$, (1-3-1)

$\epsilon i = 0$;

if $0 < Xk, i$, (1-3-2)

$\epsilon i \leq Ci$

When $(M+1)/2 < Mk$, (2)

if $Mi < (M+1)/2$, (2-1)

if $Yk, i \leq 0$, (2-1-1)

$\epsilon i \leq Ci$;

if $0 < Yk, i*\phi < Ci$, (2-1-2)

$\epsilon i < Ci - Yk, i*\phi$;

if $Ci \leq Yk, i*\phi$, (2-1-3)

$\epsilon i = 0$;

if $Mi = (M+1)/2$, (2-2)

$\epsilon i = 0$;

if $(M+1)/2 < Mi$, (2-3)

if $Yk, i \leq 0$, (2-3-1)

$\epsilon i = 0$;

if $0 < Yk, i$, (2-3-2)

$\epsilon i \leq Ci$

As described above, the value that is not less than the maximum value of $\epsilon i$ is calculated.

<<Calculation of the Value that is Not Less Than the Maximum Value of $(\epsilon i + n*Ci)/\Delta k$>>

Lastly, the value that is not less than the maximum value of $(\epsilon i + n*Ci)/\Delta k$ will be calculated.

If the relationship $n = (\Delta k - Di + \phi)/Ti$, $Dk \leq \Delta k$ and $0 < \phi \leq Ti$ are utilized in addition to the above-acquired value that is not less than the maximum value of $\epsilon i$, the following inequalities are established:

When $Mk \leq (M+1)/2$, (1)

if $Mi < (M+1)/2$, (1-1)

if $Xk, i \leq 0$, (1-1-1)

$(\epsilon i + n*Ci)/\Delta k \leq Ci/Ti\{1 + (Ti - Di)/Dk\} + Ci/Dk$;

if $0 < Xk, i < Ci/Ti$, (1-1-2)

$(\epsilon i + n*Ci)/\Delta k \leq Ci/Ti\{1 + (Ti - Di)/Dk\} + (Ci - Xk, i*Ti)/Dk$;

if $Ci/Ti \leq Xk, i$, (1-1-3)

$(\epsilon i + n*Ci)/\Delta k \leq Ci/Ti\{1 + (Ti - Di)/Dk\}$;

if $Mi = (M+1)/2$, (1-2)

if $Mk \neq (M+1)/2$, (1-2-1)

if $Ck/Dk < 1/2$, (1-2-1-1)

$(\epsilon i + n*Ci)/\Delta k \leq Ci/Ti\{1 + (Ti - Di)/Dk\} + Ci/Dk$;

if $1/2 \leq Ck/Dk$, (1-2-1-2)

$(\epsilon i + n*Ci)/\Delta k \leq Ci/Ti\{1 + (Ti - Di)/Dk\}$;

if $Mk = (M+1)/2$, (1-2-2)

$(\epsilon i + n*Ci)/\Delta k \leq Ci/Ti\{1 + (Ti - Di)/Dk\}$;

if $(M+1)/2 < Mi$, (1-3)

if $Xk, i \leq 0$, (1-3-1)

$(\epsilon i + n*Ci)/\Delta k \leq Ci/Ti\{1 + (Ti - Di)/Dk\}$;

if $0 < Xk, i$, (1-3-2)

$(\epsilon i + n*Ci)/\Delta k \leq Ci/Ti\{1 + (Ti - Di)/Dk\} + Ci/Dk$;

When $(M+1)/2 < Mk$, (2)

if $Mi < (M+1)/2$, (2-1)

if $Yk, i < Ci/Ti$, (2-1-1)

$(\epsilon i + n*Ci)/\Delta k \leq Ci/Ti\{1 + (Ti - Di)/Dk\} + (Ci - Yk, i*Ti)/Dk$;

if $Ci/Ti \leq Yk, i$, (2-1-2)

$(\epsilon i + n*Ci)/\Delta k \leq Ci/Ti\{1 + (Ti - Di)/Dk\}$;

if $(M+1)/2 \leq Mi$, (2-2)

if $Mi \leq Mk$, (2-2-1)

$(\epsilon i + n*Ci)/\Delta k \leq Ci/Ti\{1 + (Ti - Di)/Dk\}$;

if $Mk < Mi$, (2-2-2)

$(\epsilon i + n*Ci)/\Delta k \leq Ci/Ti\{1 + (Ti - Di)/Dk\} + Ci/Dk$

From the above, it is proved that $(\epsilon i+n*Ci)/\Delta k$ is not more than Uk,i.

As described above, the condition Lk<Uk has been proved to be established whenever a task raises a deadline miss.

Figure 13:
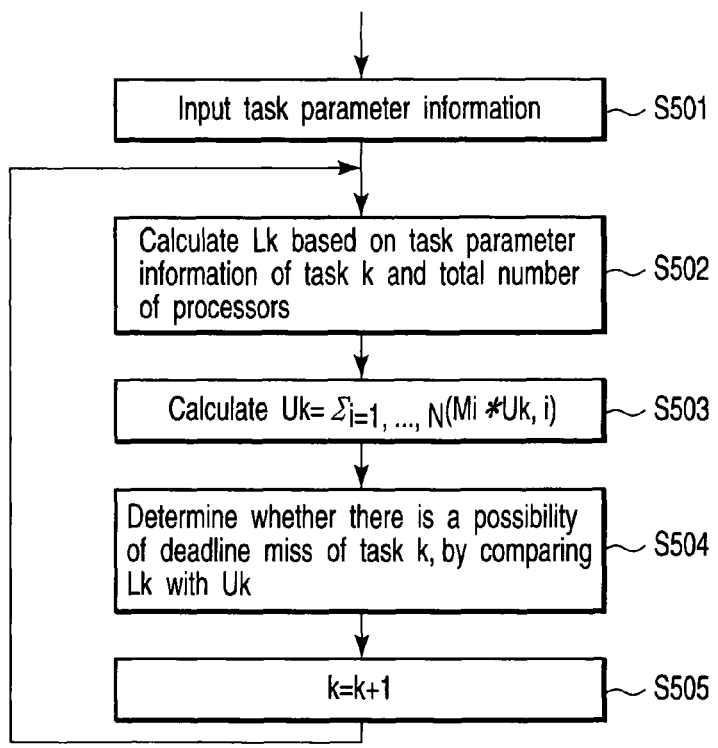
FIG. 13 is a fourth flowchart illustrating the procedure of the schedulability determination process executed by the real-time system of the embodiment.

Referring now to the flowchart of FIG. 13, a description will be given of the flow of the entire schedulability determination process executed by the schedulability determination unit 101.

The schedulability determination unit 101 acquires, through the operating system, task parameter information corresponding to each task to be scheduled, and the total number of processors (step S501). Subsequently, based on task parameter information corresponding to task k and the total number of processors, the schedulability determination unit 101 calculates the minimum average load that may cause a deadline miss in task k (step S502). The minimum average load is the above-described Lk.

After that, based on the task parameter information corresponding to each task, the schedulability determination unit 101 calculates the total of the maximum average loads of all tasks that may be generated in the period (reference average load period) ranging from the earliest time at which the average load is not less than Lk, to the time at which task k may raise a deadline miss (step S503). The total load is the above-described Uk.

The schedulability determination unit 101 determines by comparing Lk with Uk whether there is a possibility of task k raising a deadline miss (step S504). While changing task k (step S504), the schedulability determination unit 101 repeats steps S502 to S504, and determines whether any task may raise a deadline miss. If the unit 101 determines that there is no possibility of a deadline miss in any task, it determines that the tasks are schedulable.

As described above, in the embodiment, Lk and Uk are defined in consideration of the total number of processors and the number of processors used by each task, and are acquired in units of tasks to thereby determine whether Lk<Uk is established. This schedulability determination method requires only a short calculation time, and is applicable to even a case where a plurality of processors need to be simultaneously assigned to a single task.

Further, in the method, since the longest one of the reference average load period candidates is used as the reference average load period, the accuracy of the result of schedulability determination is enhanced.

In addition, since it is practical to set an upper limit for the number of processors simultaneously used by a single task, a sufficient advantage can be acquired from the method even if only the values that satisfy the two conditions, i.e., (i) $Mk \leq (M+1)/2$ and (ii) $Mi < (M+1)/2$, are defined as Uk, i.

In the above embodiment, if at least one task satisfies Lk<Uk, it is determined that real-time scheduling using the EDF algorithm is impossible. Alternatively, real-time scheduling may be determined to be possible if all tasks satisfy $Uk \leq Lk$.

Figure 14:
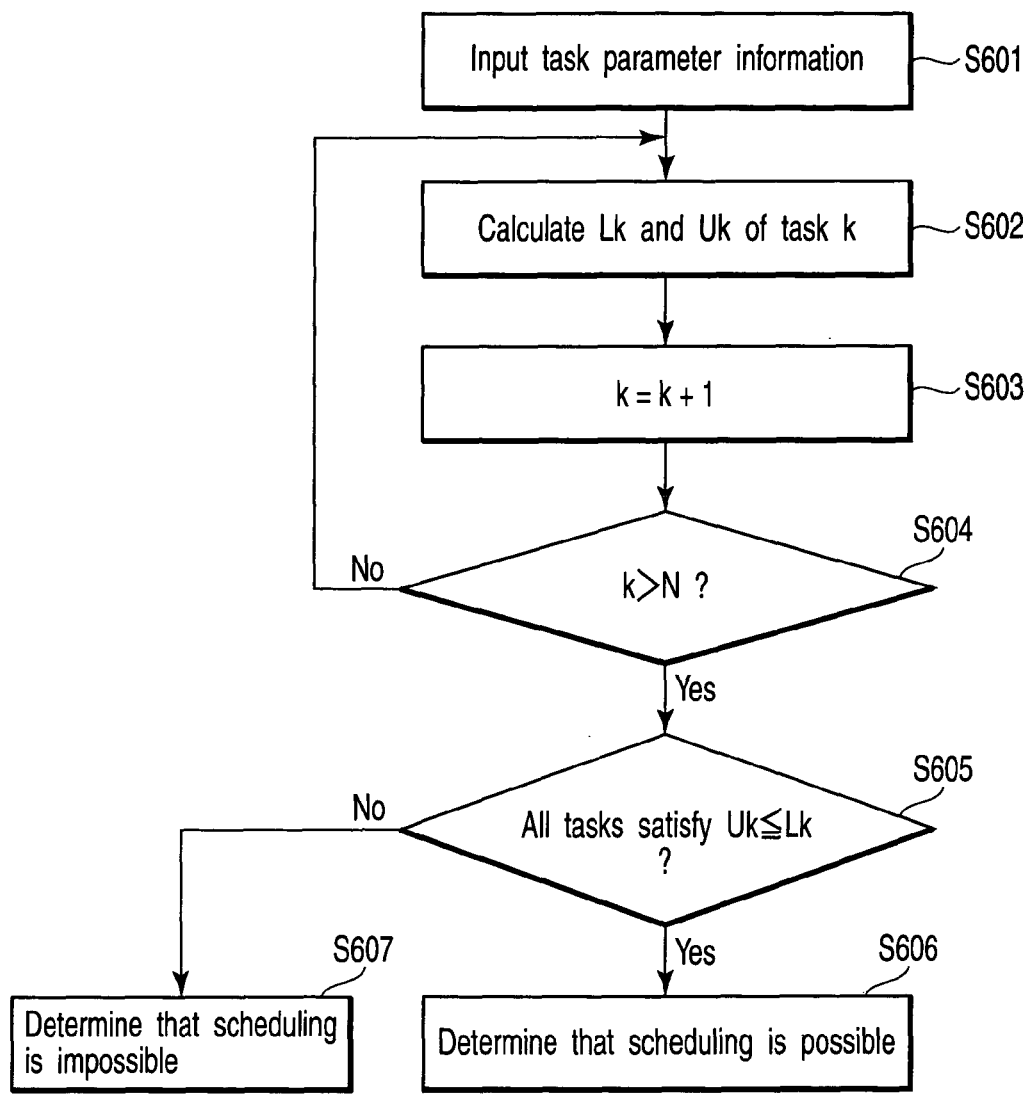
FIG. 14 is a fifth flowchart illustrating the procedure of the schedulability determination process executed by the real-time system of the embodiment.

Referring to the flowchart of FIG. 14, a schedulability determination process performed in the latter case will be described.

The schedulability determination unit 101 acquires, through the operating system, task parameter information corresponding to each task to be scheduled, and the total number of processors (step S601). Subsequently, the schedulability determination unit 101 acquires, in units of tasks k, two values for checking the possibility of occurrence of a deadline miss, i.e., Lk and Uk (step S602). Specifically, at step S602, the schedulability determination unit 101 firstly acquires the minimum average load (Lk) that may cause a deadline miss in target task k. After that, based on the task parameter information corresponding to each task, the schedulability determination unit 101 calculates the total (Uk) of the maximum average loads of all tasks that may be generated in the period (reference average load period) ranging from the earliest time at which the average load is not less than Lk, to the time at which task k may raise a deadline miss.

The schedulability determination unit 101 repeats step S602 while changing the target task (steps S603 and S604), thereby determining Lk and Uk for each task. Thereafter, the schedulability determination unit 101 determines whether each task satisfies the condition $Uk \leq Lk$ (step S605). If all tasks are determined to satisfy the condition, the schedulability determination unit 101 determines that scheduling is impossible (step S607).

Figure 15:
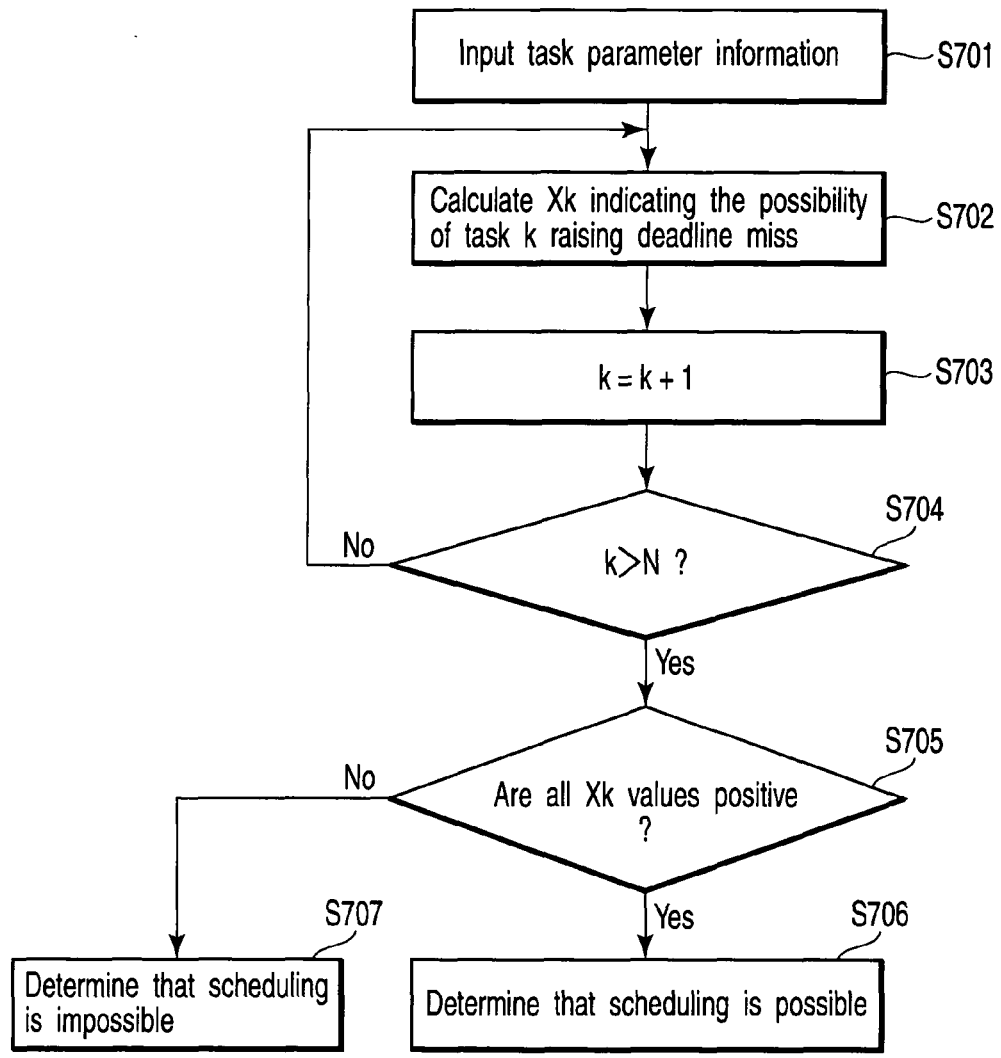
FIG. 15 is a sixth flowchart illustrating the procedure of the schedulability determination process executed by the real-time system of the embodiment.

Referring then to the flowchart of FIG. 15, another example of the schedulability determination process will be descried.

In this example, value Xk is used which indicates the possibility of a deadline miss when task k is scheduled using the EDF algorithm. Xk is defined as Xk=Uk−Lk.

The schedulability determination unit 101 acquires, through the operating system, task parameter information corresponding to each task to be scheduled, and the total number of processors (step S701). Subsequently, the schedulability determination unit 101 acquires value Xk indicating the possibility of task k raising a deadline miss (step S702). Specifically, at step S702, the schedulability determination unit 101 firstly acquires the minimum average load (Lk) that may cause a deadline miss in target task k. After that, based on the task parameter information corresponding to each task, the schedulability determination unit 101 calculates the total (Uk) of the maximum average loads of all tasks that may be generated in the period (reference average load period) ranging from the earliest time at which the average load is not less than Lk, to the time at which task k may raise a deadline miss. Using the thus acquired Uk and Lk, value Xk indicating the possibility of task k raising a deadline miss is calculated.

The schedulability determination unit 101 repeats step S702 while changing the target task (steps S703 and S704), thereby determining Xk for each task.

Thereafter, the schedulability determination unit 101 determines whether Xk corresponding to each task is a positive value (step S705). If Xk values corresponding to all tasks are determined to be positive values, the schedulability determination unit 101 determines that scheduling is possible (step S706). If they are not positive values, the unit 101 determines that scheduling is impossible (step S707).

The schedulability determination methods employed in the embodiment are all realized by computer programs. Therefore, the advantage of the embodiment can be easily acquired by installing the computer programs into a computer via a computer-readable recording medium that stores the computer programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A schedulability determination method of determining whether real-time scheduling of a plurality of tasks is possible using a plurality of processors, the method being executed by a processing system and comprising:

(1) acquiring task parameter information indicating an interval of each of the tasks, a number of the one or more processors simultaneously used by said each task, a processing time of said each task, and a relative deadline of said each task;

(2) calculating a minimum average load which causes a deadline miss in a task to be detected whether to raise the deadline miss, which is included in the tasks, based on the task parameter information corresponding to the task to be detected, and total number of the processors;

(3) calculating, based on the task parameter information corresponding to said each task, a total of maximum average loads of the tasks which are generated in a period ranging from an earliest time at which an average load is not less than the calculated minimum average load, to a time at which the task to be detected raises a deadline miss;

(4) repeating (2) calculating the minimum average load and (3) calculating the total, while changing the task to be detected; and (5) determining that real-time scheduling of the tasks is possible using the processors, and performing real-time scheduling of the tasks using the processors, if the calculated total is greater than the calculated minimum average load.

2. The method according to claim 1, wherein the real-time scheduling includes real-time scheduling performed using an earliest deadline first algorithm.

3. A real-time system comprising:

a plurality of processors;

an acquiring unit configured to acquire task parameter information indicating an interval of each of a plurality of tasks, number of one or more processors included in the processors and simultaneously used by said each task, a processing time of said each task, and a relative deadline of said each task;

a first calculating unit configured to calculate a minimum average load which causes a deadline miss in a task to be detected whether to raise the deadline miss, which is included in the tasks, based on the task parameter information corresponding to the task to be detected, and total number of the processors;

a second calculating unit configured to calculate, based on the task parameter information corresponding to said each task, a total of maximum average loads of the tasks which are generated in a period ranging from an earliest time at which an average load is not less than the calculated minimum average load, to a time at which the task to be detected raises a deadline miss;

a performing unit configured to perform real-time scheduling of the tasks using the processors, if the calculated total is greater than the calculated minimum average load.

4. The system according to claim 3, wherein the performing unit includes a scheduling performing unit configured to perform the real-time scheduling using an earliest deadline first algorithm.

5. A program stored in a computer storage medium, the program, when executed by a processing system performing a schedulability determination process for determining whether real-time scheduling of a plurality of tasks is possible using a plurality of processors, the process comprising:

(1) instructing the computer to acquire task parameter information indicating an interval of each of the tasks, number of the one or more processors simultaneously used by said each task, a processing time of said each task, and a relative deadline of said each task;

(2) instructing the computer to calculate a minimum average load which causes a deadline miss in a task to be detected whether to raise the deadline miss, which is included in the tasks, based on the task parameter information corresponding to the task to be detected, and total number of the processors;

(3) instructing the computer to calculate, based on the task parameter information corresponding to said each task, a total of maximum average loads of the tasks which are generated in a period ranging from an earliest time at which an average load is not less than the calculated minimum average load, to a time at which the task to be detected raises a deadline miss;

(4) instructing the computer to repeat (2) the calculation of the minimum average load and (3) the calculation of the total, while changing the task to be detected; and (5) instructing the computer to determine that real-time scheduling of the tasks is possible using the processors, and performing real-time scheduling of the tasks using the processors, if the calculated total is greater than the calculated minimum average load.

6. The program according to claim 5, wherein the real-time scheduling is performed using an earliest deadline first algorithm.

7. A schedulability determination method of determining whether real-time scheduling of a plurality of tasks is possible using a plurality of processors, being executed by a processing system and comprising:

calculating $L_k$ and $$\sum_{i=1...N} M_i * U_{k,i}, (1 \leq k, i \leq N; k, i, N : \text{integer})$$

where $L_k$ corresponds to a task k which is included in the tasks, $M_i$ represents a number of the plurality of processors simultaneously used by the task i, $U_{k,i}$ is a value uniquely determined in units of combinations of tasks k and i, and guaranteed to be not less than an average single load time of task i in a reference average load period of task k (higher than the average load signal time, if i=k), when task k raises a deadline miss, and N represents the number of tasks; and determining that real-time scheduling of the tasks is possible using the processors, and performing real-time scheduling of the tasks using the processors, if the tasks all satisfy a plurality of conditions, $$\sum_{i=1...N} M_i * U_{k,i} \leq L_k \text{ for all } k \ (1 \leq k \leq N),$$

wherein:

$L_k$ corresponds to a task k which is to be detected to satisfy a corresponding one of the conditions, $L_k$ being expressed as follows:

if $M_k \leq (M+1)/2$, \hfill (1)

$L_k = (M - M_k + 1) - (M - 2M_k + 1)C_k/D_k$ if $(M+1)/2 < M_k$, \hfill (2)

$L_k = M - M_k + 1$; and $U_{k,i}$ is expressed as follows:

if $M_k \leq (M+1)/2$, \hfill (1)

and if $M_i<(M+1)/2$, and if $X_{k,i}\leq 0$, $U_{k,i}=C_i/T_i\{1+(T_i-D_i)/D_k\}+C_i/D_k$;

if $M_k\leq(M+1)/2$, (1)

and if $M_i<(M+1)/2$, and if $0<X_{k,i}<C_i/T_i$, $U_{k,i}=C_i/T_i\{1+(T_i-D_i)/D_k\}+(C_i-X_{k,i}*T_i)/D_k$;

if $M_k\leq(M+1)/2$, (1)

and if $M_i<(M+1)/2$, and if $C_i/T_i\leq X_{k,i}$, $U_{k,i}=C_i/T_i\{1+(T_i-D_i)/D_k\}$;

if $M_k\leq(M+1)/2$, (1)

and if $M_i=(M+1)/2$, and if $M_k\neq(M+1)/2$, and if $C_k/D_k<1/2$, $U_{k,i}=C_i/T_i\{1+(T_i-D_i)/D_k\}+C_i/D_k$;

if $M_k\leq(M+1)/2$, (1)

and if $M_i=(M+1)/2$, and if $M_k\neq(M+1)/2$, and if $1/2\leq C_k/D_k$, $U_{k,i}=C_i/T_i\{1+(T_i-D_i)/D_k\}$ if $M_k\leq(M+1)/2$, (1)

and if $M_i=(M+1)/2$, and if $M_k=(M+1)/2$, $U_{k,i}=C_i/T_i\{1+(T_i-D_i)/D_k\}$;

if $M_k\leq(M+1)/2$, (1)

and if $(M+1)/2<M_i$, and if $X_{k,i}\leq 0$, $U_{k,i}=C_i/T_i\{1+(T_i-D_i)/D_k\}$;

if $M_k\leq(M+1)/2$, (1)

and if $(M+1)/2<M_i$, and if $0<X_{k,i}$, $U_{k,i}=C_i/T_i\{1+(T_i-D_i)/D_k\}+C_i/Dk$;

if $(M+1)/2<M_k$, (2)

and if $M_i<(M+1)/2$, and if $Y_{k,i}<C_i/T_i$, $U_{k,i}=C_i/T_i\{1+(T_i-D_i)/D_k\}+(C_i-Y_{k,i}*T_i)/D_k$;

if $(M+1)/2<M_k$, (2)

and if $M_i<(M+1)/2$, and if $C_i/T_i\leq Y_{k,i}$, $U_{k,i}=C_i/T_i\{1+(T_i-D_i)/D_k\}$;

if $(M+1)/2<M_k$, (2)

and if $(M+1)/2\leq M_i$, and if $M_i\leq M_k$, $U_{k,i}=C_i/T_i\{1+(T_i-D_i)/D_k\}$;

if $(M+1)/2<M_k$, (2)

and if $(M+1)/2\leq M_i$, and if $M_k<M_i$, $U_{k,i}=C_i/T_i\{1+(T_i-D_i)/D_k\}+C_i/D_k$;

where M represents number of the processors, $T_i$ represents an interval of a task i included in the tasks, $C_i$ represents a process time for processing the task i, $D_i$ represents a relative deadline of the task i, and $X_{k,i}=\{M_k-M_i+(M-2M_k+1)C_k/D_k\}/(M-2M_i+1)$, $Y_{k,i}=(M_k-M_i)/(M-2M_i+1)$.

8. The method according to claim 7, wherein the real-time scheduling includes real-time scheduling performed using an earliest deadline first algorithm.

9. A real-time system comprising:
a plurality of processors;
a calculating unit configured to calculate $L_k$ and $$\sum_{i=1...N} M_i * U_{k,i} (1\leq k, i\leq N; k, i, N : \text{integer})$$

where $L_k$ corresponds to a task k which is included in the tasks, $M_i$ represents a number of the plurality of processors simultaneously used by the task i, $U_{k,i}$ is a value uniquely determined in units of combinations of tasks k and i, and guaranteed to be not less than an average single load time of task i in a reference average load period of task k (higher than the average load signal time, if i=k), when task k raises a deadline miss, and N represents the number of tasks;

a determining unit configured to determine that real-time scheduling of the tasks is possible using the processors, if the tasks all satisfy a plurality of conditions, $$\sum_{i=1...N} M_i * U_{k,i} \leq L_k \text{ for all } k \ (1\leq k\leq N);$$

and a performing unit configured to perform real-time scheduling of the tasks using the processors, if the determining unit determines that the real-time scheduling is possible, wherein:

$L_k$ corresponds to a task k which is to be detected to satisfy a corresponding one of the conditions, $L_k$ being expressed as follows:

if $M_k\leq(M+1)/2$, (1)

$L_k=(M-M_k+1)-(M-2M_k+1)C_k/D_k$ if $(M+1)/2<M_k$, (2)

$L_k=M-M_k+1$; and $U_{k,i}$ is expressed as follows:

if $M_k\leq(M+1)/2$, (1)

and if $M_i<(M+1)/2$, and if $X_{k,i}\leq 0$, $U_{k,i}=C_i/T_i\{1+(T_i-D_i)/D_k\}+C_i/D_k$;

if $M_k\leq(M+1)/2$, (1)

and if $M_i<(M+1)/2$, and if $0<X_{k,i}<C_i/T_i$, $U_{k,i}=C_i/T_i\{1+(T_i-D_i)/D_k\}+(C_i-X_{k,i}*T_i)D_k$;

if $M_k\leq(M+1)/2$, (1)

and if $M_i<(M+1)/2$, and if $C_i/T_i\leq X_{k,i}$, $U_{k,i}=C_i/T_i\{1+(T_i-D_i)/D_k\}$;

if $M_k\leq(M+1)/2$, (1)

and if $M_i=(M+1)/2$, and if $M_k\neq(M+1)/2$, and if $C_k/D_k<1/2$, $U_{k,i}=C_i/T_i\{1+(T_i-D_i)/D_k\}+C_i/D_k$;

if $M_k\leq(M+1)/2$, (1)

and if $M_i=(M+1)/2$, and if $M_k\neq(M+1)/2$, and if $1/2\leq C_k/D_k$, $U_{k,i}=C_{i/Ti}\{1+(T_i-D_i)/D_k\}$ if $M_k\leq(M+1)/2$, (1)

and if $M_i=(M+1)/2$, and if $M_k=(M+1)/2$, $U_{k,i}=C_i/T_i\{1+(T_i-D_i)/D_k\}$;

if $M_k\leq(M+1)/2$, (1)

and if $(M+1)/2<M_i$, and if $X_{k,i}\leq 0$, $U_{k,i}=C_i/T_i\{1+(T_i-D_i)/D_k\}$;

if $M_k\leq(M+1)/2$, (1)

and if $(M+1)/2<M_i$, and if $0<X_{k,i}$, $U_{k,i}=C_i/T_i\{1+(T_i-D_i)/D_k\}+C_i/D_k$;

if $(M+1)/2<M_k$, (2)

and if $M_i<(M+1)/2$, and if $Y_{k,i}<C_i/T_i$, $U_{k,i}=C_i/T_i\{1+(T_i-D_i)/D_k\}+(C_i-Y_{k,i}*T_i)/D_k$;

if $(M+1)/2<M_k$, (2)

and if $M_i<(M+1)/2$, and if $C_i/T_i\leq Y_{k,i}$, $U_{k,i}=C_i/T_i\{1+(T_i-D_i)/D_k\}$;

if $(M+1)/2<M_k$, (2)

and if $(M+1)/2\leq M_i$, and if $M_i\leq M_k$, $U_{k,i}=C_{i/Ti}\{1+(T_i-D_i)/D_k\}$;

if $(M+1)/2<M_k$, (2)

and if $(M+1)/2\leq M_i$, and if $M_k<M_i$, $U_{k,i}=C_i/T_i\{1+(T_i-D_i)/D_k\}+C_i/D_k$;

where M represents number of the processors, $T_i$ represents an interval of a task i included in the tasks, $C_i$ represents a process time for processing the task i, $D_i$ represents a relative deadline of the task i, and $X_{k,i}=\{M_k-M_i+(M-2M_k+1)C_k/D_k\}/(M-2M_i+1)$, $Y_{k,i}=(M_k-M_i)/(M-2M_i+1)$.

10. The method according to claim 9, wherein the real-time scheduling includes real-time scheduling performed using an earliest deadline first algorithm.

11. The real-time system according to claim 9, wherein the performing unit includes a scheduling performing unit configured to perform the real-time scheduling using an earliest deadline first algorithm.

12. A program stored in a computer storage medium, the program, when executed by a processing system performing a schedulability determination process for determining whether real-time scheduling of a plurality of tasks is possible using a plurality of processors, the process comprising:

instructing the computer to calculate $L_k$ and $$\sum_{i=1...N} M_i * U_{k,i}, (1\leq k, i\leq N; k, i, N : \text{integer})$$

where $L_k$ corresponds to a task k which is included in the tasks, $M_i$ represents a number of the plurality of processors simultaneously used by the task i, $U_{k,i}$ corresponds to a value uniquely determined in units of combinations of tasks k and i, and guaranteed to be not less than an average single load time of task i in a reference average load period of task k (higher than the average load signal time, if i=k), when task k raises a deadline miss, and N represents the number of tasks; and instructing the computer to determine that real-time scheduling of the tasks is possible using the processors, and performing real-time scheduling of the tasks using the processors, if the tasks all satisfy a plurality of conditions, $$\sum_{i=1\ldots N} M_i * U_{k,i} \le L_k \text{ for all } k \ (1 \le k \le N),$$

wherein:

$L_k$ corresponds to a task k which is to be detected to satisfy a corresponding one of the conditions, $L_k$ being expressed as follows:

if $M_k \le (M+1)/2$, (1)

$L_k = (M-M_k+1) - (M-2M_k+1)C_k/D_k$ if $(M+1)/2 < M_k$, (2)

$L_k = M - M_k + 1$; and $U_{k,i}$ is expressed as follows:

if $M_k \le (M+1)/2$, (1)

and if $M_i < (M+1)/2$, and if $X_{k,i} \le 0$, $U_{k,i} = C_i/T_i\{1+(T_i-D_i)/D_k\} + C_i/D_k$;

if $M_k \le (M+1)/2$, (1)

and if $M_i < (M+1)/2$, and if $0 < X_{k,i} < C_i/T_i$, $U_{k,i} = C_i/T_i\{1+(T_i-D_i)/D_k\} + (C_i - X_{k,i}*T_i)/D_k$;

if $M_k \le (M+1)/2$, (1)

and if $M_i < (M+1)/2$, and if $C_i/T_i \le X_{k,i}$, $U_{k,i} = C_i/T_i\{1+(T_i-D_i)/D_k\}$;

if $M_k \le (M+1)/2$, (1)

and if $M_i = (M+1)/2$, and if $M_k \ne (M+1)/2$, and if $C_k/D_k < 1/2$, $U_{k,i} = C_i/T_i\{1+(T_i-D_i)/D_k\} + C_i/D_k$;

if $M_k \le (M+1)/2$, (1)

and if $M_i = (M+1)/2$, and if $M_k \ne (M+1)/2$, and if $1/2 \le C_k/D_k$, $U_{k,i} = C_i/T_i\{1+(T_i-D_i)/D_k\}$ if $M_k \le (M+1)/2$, (1)

and if $M_i = (M+1)/2$, and if $M_k = (M+1)/2$, $U_{k,i} = C_i/T_i\{1+(T_i-D_i)/D_k\}$;

if $M_k \le (M+1)/2$, (1)

and if $(M+1)/2 < M_i$, and if $X_{k,i} \le 0$, $U_{k,i} = C_i/T_i\{1+(T_i-D_i)D_k\}$;

if $M_k \le (M+1)/2$, (1)

and if $(M+1)/2 < M_i$, and if $0 < X_{k,i}$, $U_{k,i} = C_i/T_i\{1+(T_i-D_i)/D_k\} + C_i/D_k$;

if $(M+1)/2 < M_k$, (2)

and if $M_i < (M+1)/2$, and if $Y_{k,i} < C_i/T_i$, $U_{k,i} = C_i/T_i\{1+(T_i-D_i)/D_k\} + (C_i - Y_{k,i}*T_i)/D_k$;

if $(M+1)/2 < M_k$, (2)

and if $M_i < (M+1)/2$, and if $C_i/T_i \le Y_{k,i}$, $U_{k,i} = C_i/T_i\{1+(T_i-D_i)/D_k\}$;

if $(M+1)/2 < M_k$, (2)

and if $(M+1)/2 \le M_i$, and if $M_i \le M_k$, $U_{k,i} = C_i/T_i\{1+(T_i-D_i)/D_k\}$;

if $(M+1)/2 < M_k$, (2)

and if $(M+1)/2 \le M_i$, and if $M_k < M_i$, $U_{k,i} = C_i/T_i\{1+(T_i-D_i)/D_k\} + C_i/D_k$;

where M represents number of the processors, $T_i$ represents an interval of a task i included in the tasks, $C_i$ represents a process time for processing the task i, $D_i$ represents a relative deadline of the task i, and $X_{k,i} = \{Mk-Mi+(M-2Mk+1)Ck/Dk\}/(M-2Mi+1)$, $Y_{k,i} = (Mk-Mi)/(M-2Mi+1)$.

13. The program according to claim 12, wherein the real-time scheduling is performed using an earliest deadline first algorithm.

\* \* \* \* \*